(12) United States Patent
Lee et al.

(10) Patent No.: US 11,193,828 B2
(45) Date of Patent: Dec. 7, 2021

(54) SPECTROSCOPIC APPARATUS BASED ON ASYNCHRONOUS MODULATION

(71) Applicant: ELECTRONICS AND TELECOMMUNICATIONS RESEARCH INSTITUTE, Daejeon (KR)

(72) Inventors: Won Kyoung Lee, Daejeon (KR); Hong-Seok Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/014,258

(22) Filed: Sep. 8, 2020

(65) Prior Publication Data

US 2021/0123807 A1    Apr. 29, 2021

(30) Foreign Application Priority Data

Oct. 29, 2019   (KR) .................. 10-2019-0135845

(51) Int. Cl.
*G01J 3/44*   (2006.01)
*G01J 3/10*   (2006.01)
*G01N 21/65*   (2006.01)
*G01J 3/02*   (2006.01)

(52) U.S. Cl.
CPC ............... *G01J 3/44* (2013.01); *G01J 3/0229* (2013.01); *G01J 3/10* (2013.01); *G01N 21/65* (2013.01); *G01N 2201/06113* (2013.01)

(58) Field of Classification Search
CPC ........ G01J 3/44; G01J 3/10; G01J 3/02; G01J 3/0229; G01N 21/65; G01N 2201/06113; G01N 21/01; G01N 33/48
See application file for complete search history.

(56) References Cited

U.S. PATENT DOCUMENTS

| 2005/0122570 | A1 | 6/2005 | Chang et al. |
| 2016/0169748 | A1 | 6/2016 | Zheng et al. |
| 2016/0252394 | A1* | 9/2016 | Antila .................... G01N 21/65 356/519 |
| 2016/0290922 | A1 | 10/2016 | Hudson |
| 2018/0328851 | A1 | 11/2018 | Lee et al. |
| 2019/0128733 | A1 | 5/2019 | Kang et al. |

OTHER PUBLICATIONS

E.S. Fotso Gueutue et al., "Nanosecond time-resolved Raman spectroscopy for solving some Raman problems such as luminescence or thermal emission", Journal of Raman Spectroscopy, Jul. 26, 2017.

* cited by examiner

*Primary Examiner* — Abdullahi Nur
(74) *Attorney, Agent, or Firm* — LRK Patent Law Firm

(57) ABSTRACT

A spectroscopic apparatus includes a splitter that receives a first detected signal output from a sample to which an incident beam is irradiated, and outputs a reflected signal and a second detected signal by splitting the first detected signal, and a signal processor that receives the reflected signal and the second detected signal, and extracts a Raman signal from the second detected signal in response to the received reflected signal.

17 Claims, 21 Drawing Sheets

SPECTROSCOPIC APPARATUS BASED ON ASYNCHRONOUS MODULATION

CROSS-REFERENCE TO RELATED APPLICATION

This application claims priority under 35 U.S.C. § 119 to Korean Patent Application No. 10-2019-0135845 filed on Oct. 29, 2019, in the Korean Intellectual Property Office, the disclosures of which are incorporated by reference herein in their entireties.

BACKGROUND

1. Field of the Invention

Embodiments of the inventive concept described herein relate to a spectroscopic apparatus, and more particularly, relate to a spectroscopic apparatus based on an asynchronous modulation, which analyzes molecular information of a sample.

2. Description of Related Art

Recently, there is an increasing demand for a personalized medical industry to diagnose diseases early and increase survival rate through appropriate treatment. In particular, there is an increasing need for molecular diagnostic techniques that can accurately measure and analyze the diseases in the molecular level, such as a DeoxyriboNucleic Acid (DNA) or a RiboNucleic Acid (RNA).

Raman spectroscopy is one of the molecular diagnostic techniques. The Raman spectroscopy is a technique that measures light scattered from molecules of a sample having an unstable energy state excited by light and analyzes the components of the sample. In this case, to accurately analyze the sample, a precise synchronization between a laser device that irradiates optical signals to the sample and a detector that receives scattered signals is required.

SUMMARY

Embodiments of the inventive concept provide a spectroscopic apparatus based on an asynchronous modulation, which controls a timing at which a detector processes a detected signal.

According to an embodiment of the inventive concept, a spectroscopic apparatus includes a splitter that receives a first detected signal output from a sample to which an incident beam is irradiated and outputs a reflected signal and a second detected signal by separating the first detected signal, and a signal processor that receives the reflected signal and the second detected signal and extracts a Raman signal from the second detected signal in response to the received reflected signal.

According to an embodiment, the first detected signal may include the reflected signal, the Raman signal, and a noise signal, and the reflected signal reaches the splitter before the Raman signal and the noise signal.

According to an embodiment, the signal processor may be further configured to include lifetime information of the Raman signal, and to extract the Raman signal from the second detected signal during a time corresponding to the lifetime information from a timing determined based on the received reflected signal.

According to an embodiment, the spectroscopic apparatus may further include a controller that outputs a control signal that controls irradiation time of the incident beam, and a pulse laser that receives the control signal and irradiates the sample with the incident beam including a pulse laser beam in response to the received control signal.

According to an embodiment, the spectroscopic apparatus may further include an orthogonal code generator that generates an orthogonal code, a continuous wave laser that outputs a continuous wave laser beam, and a modulator that receives the continuous wave laser beam and the orthogonal code and irradiates the sample with the incident beam obtained by modulating the continuous wave laser beam with the orthogonal code, and the signal processor may be further configured to receive the orthogonal code and to demodulate the second detected signal with the orthogonal code in response to the received reflected signal to extract the Raman signal.

According to an embodiment, the spectroscopic apparatus may further include an orthogonal code generator that generates an orthogonal code, a controller that receives the orthogonal code and outputs a control signal based on the received orthogonal code, a light source that receives the control signal and outputs a time-resolved beam including a high frequency pulse laser beam in response to the control signal, and a power amplifier that receives the time-resolved beam and irradiates the sample with the incident beam obtained by amplifying the time-resolved beam, and the signal processor may be further configured to receive the orthogonal code and to demodulate the second detected signal with the orthogonal code in response to the received reflected signal to extract the Raman signal.

According to an embodiment of the inventive concept, a spectroscopic apparatus includes a multi-channel laser irradiation device that irradiates an incident beam to a sample and outputs a trigger beam, a delay element that receives the trigger beam and outputs a delayed trigger beam, and a detector that receives the first detected signal output from the sample to which the incident beam is irradiated and the delayed trigger beam and extracts a Raman signal from the first detected signal in response to the delayed trigger beam.

According to an embodiment, the delay element may be further configured to output the delayed trigger beam obtained by delaying the trigger beam by a time required for the Raman signal to reach the detector.

According to an embodiment, the detector may include a filter that receives the first detected signal and outputs a second detected signal in which a reflected signal is cut off from the first detected signal, and a signal processor that receives the second detected signal and the delayed trigger beam and extracts the Raman signal from the second detected signal in response to the delayed trigger beam.

According to an embodiment, the multi-channel laser irradiation device may include a multi-channel controller that outputs a first control signal including a first wavelength information and a second control signal including a second wavelength information different from the first wavelength information, and a pulse laser that receives the first and second control signals, irradiates the sample with the incident beam including a pulse laser beam having a first wavelength, based on the first control signal, and outputs the trigger beam including a pulse laser beam having a second wavelength, based on the second control signal.

According to an embodiment, the spectroscopic apparatus may further include an orthogonal code generator that generates an orthogonal code, and the multi-channel laser irradiation device may include a multi-channel continuous wave laser that outputs a continuous wave laser beam having a first frequency and the trigger beam having a second frequency different from the first frequency, and a modulator that receives the continuous wave laser beam and the orthogonal code, and irradiates the sample with the incident beam obtained by modulating the continuous wave laser beam with the orthogonal code, and the detector may include a filter that receives the first detected signal and outputs a second detected signal in which a reflected signal is cut off from the first detection signal, a receiving controller that receives the second detected signal and the delayed trigger beam, outputs a trigger signal that determines a demodulation timing, based on the delayed trigger beam, and outputs the second detected signal that is converted into an electrical signal that can be demodulated, based on the second detection signal, and a demodulator that receives the converted second detection signal, the trigger signal, and the orthogonal code, and extracts the Raman signal by demodulating the converted second detected signal with the orthogonal code in response to the trigger signal.

According to an embodiment, the spectroscopic apparatus may further include an orthogonal code generator configured to generate an orthogonal code, and the multi-channel laser irradiation device may include a multi-channel controller that outputs a first control signal including a first wavelength and first frequency information, and to output a second control signal including a second wavelength and second frequency information respectively different from the first wavelength and first frequency information, a light source that receives the first and second control signals, outputs a time-resolved beam including a pulse laser beam having the first wavelength and the first frequency information, based on the first control signal, and outputs the trigger beam including a pulse laser beam having the second wavelength and the second frequency information, based on the second control signal, and a power amplifier that receives the time-resolved beam and to irradiate the sample with the incident beam obtained by amplifying the time-resolved beam, and the detector may include a filter that receives the first detected signal and outputs a second detected signal in which a reflected signal is cut off from the first detection signal, a receiving controller that receives the second detected signal and the delayed trigger beam, outputs a trigger signal that determines a demodulation timing, based on the delayed trigger beam, and outputs the second detected signal that is converted into an electrical signal that can be demodulated, based on the second detection signal, and a demodulator that receives the converted second detection signal, the trigger signal, and the orthogonal code, and extracts the Raman signal by demodulating the converted second detected signal with the orthogonal code in response to the trigger signal.

According to an embodiment of the inventive concept, a spectroscopic apparatus includes an overhead signal generator that outputs an overhead signal including a series of overhead start bits and a series of overhead end bits, a laser irradiation device that includes a detection code, receives the overhead signal, and irradiates a sample with an incident beam sequentially including a first overhead start section corresponding to the overhead start bits, a first overhead end section corresponding to the overhead end bits, and an irradiation section corresponding to the detection code, which are based on the detection code and the overhead signal, and a detector that receives a third detected signal sequentially including a second overhead start section corresponding to the overhead start bits, a second overhead end section corresponding to the overhead end bits, and a detection section corresponding to the detection code, from the sample to which the incident beam is irradiated, determines a timing to process the third detected signal, based on the third detected signal received in the second overhead start section and the second overhead end section, and extracts a Raman signal from the third detected signal at the determined timing.

According to an embodiment, the detector may be further configured to determine a time at which the third detected signal of the second overhead start section is received as a second overhead start time, to determine a time at which the third detected signal of the second overhead end section is received as a second overhead end time, and to determine a time elapsed by a difference between the second overhead end time and the second overhead start time from the second overhead end time as the timing to process the third detected signal.

According to an embodiment, the detector may include a filter that receives the third detected signal and outputs a fourth detection signal in which a reflected signal is cut off from the third detected signal, and a signal processor that receives the fourth detection signal and extracts the Raman signal from the fourth detection signal at the determined timing.

According to an embodiment, the laser irradiation device may include a controller that includes the detection code, receives the overhead signal, and outputs a control signal that controls irradiation of the incident beam, based on the detection code and the overhead signal, and a pulse laser that receives the control signal and irradiates the sample with the incident beam including a pulse laser beam in response to the received control signal.

According to an embodiment, the spectroscopic apparatus may further include an orthogonal code generator that generates an orthogonal code, and the laser irradiation device may include a continuous wave laser that outputs a continuous wave laser beam, and a modulator that receives the continuous wave laser beam, the orthogonal code, and the overhead signal, determines a value of the detection code, based on the orthogonal code, and irradiates the sample with the incident beam obtained by modulating the continuous wave laser beam based on the detection code and the overhead signal, the detector may include a filter that receives the third detected signal and outputs a fourth detection signal in which a reflected signal is cut off from the third detected signal, a receiving controller that receives the fourth detection signal, outputs a trigger signal that determines a demodulation timing, based on the fourth detection signal of the second overhead start section and the second overhead end section, and outputs the fourth detection signal that is converted into an electrical signal that can be demodulated, based on the fourth detection signal, and a demodulator that receives the converted fourth detection signal, the trigger signal, and the orthogonal code, and extracts the Raman signal by demodulating the converted fourth detection signal with the orthogonal code in response to the trigger signal.

According to an embodiment, the spectroscopic apparatus may further include an orthogonal code generator that generate an orthogonal code, and the laser irradiation device may include a controller that receives the orthogonal code and the overhead signal, determines a value of the detection code, based on the orthogonal code, and outputs a control signal, based on the detection code and the overhead signal, a light source that receives the control signal, outputs a time-resolved beam including a high frequency pulse laser beam in response to the control signal, and a power amplifier that receives the time-resolved beam and irradiates the sample with the incident beam obtained by amplifying the time-resolved beam, and the detector may include a filter that receives the third detected signal and outputs a fourth detection signal in which a reflected signal is cut off from the third detected signal, a receiving controller that receives the fourth detection signal, outputs a trigger signal that determines a demodulation timing, based on the fourth detection signal of the second overhead start section and the second overhead end section, and outputs the fourth detection signal that is converted into an electrical signal that can be demodulated, based on the fourth detection signal, and a demodulator that receives the converted fourth detection signal, the trigger signal, and the orthogonal code, and extracts the Raman signal by demodulating the converted fourth detection signal with the orthogonal code in response to the trigger signal.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Hereinafter, embodiments of the inventive concept will be described clearly and in detail such that those skilled in the art may easily carry out the inventive concept.

Figure 1:
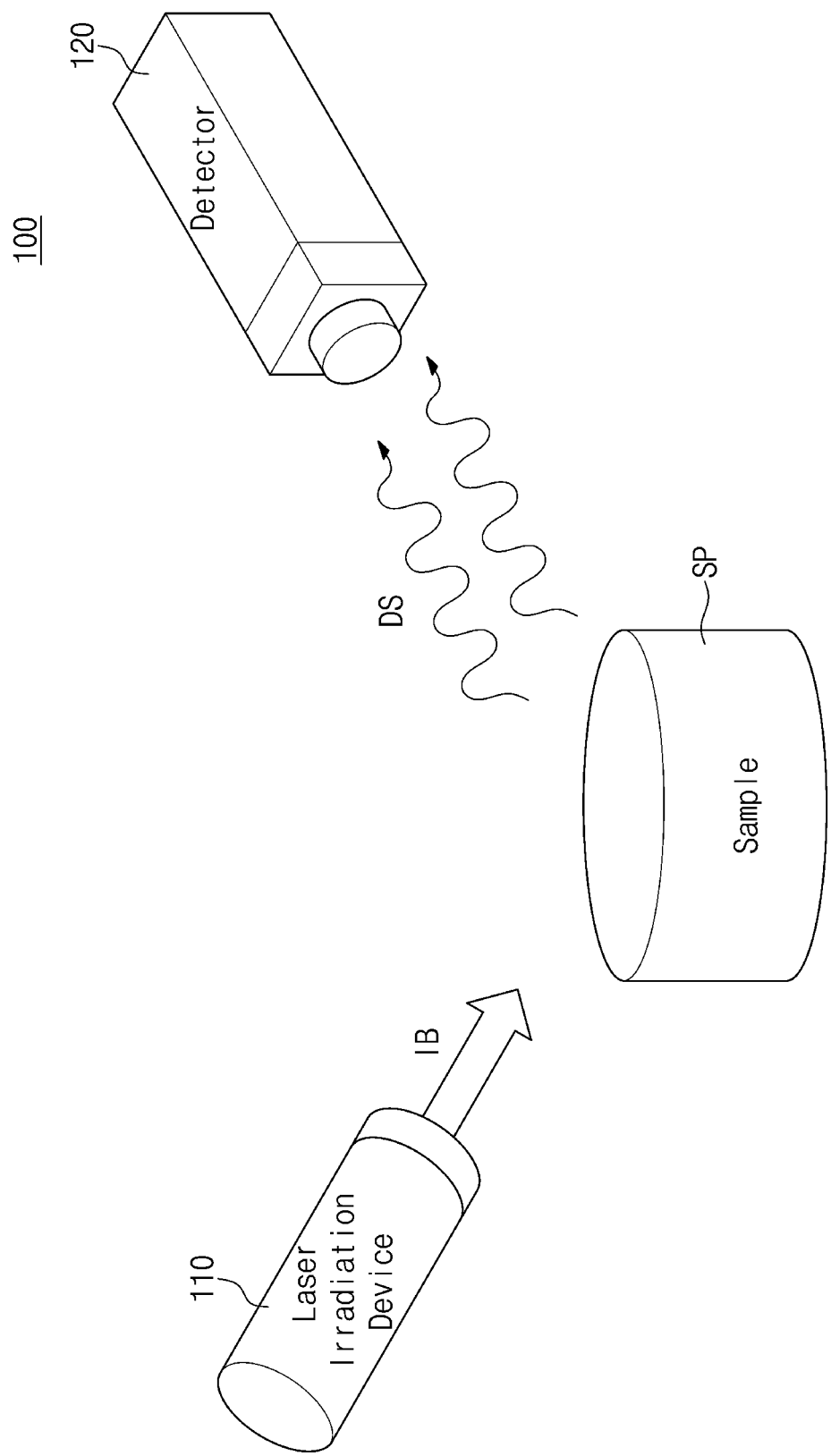
FIG. 1 is a diagram illustrating a spectroscopic apparatus according to an embodiment of the inventive concept.

FIG. 1 is a diagram illustrating a spectroscopic apparatus according to an embodiment of the inventive concept. Referring to FIG. 1, a spectroscopic apparatus 100 may include a laser irradiation device 110 and a detector 120. The spectroscopic apparatus 100 may be an apparatus that analyzes a sample SP. In this case, the sample SP may be a bio sample to be analyzed. For example, the sample SP may be feces including nucleic acids such as a DNA and an RNA.

The laser irradiation device 110 may irradiate an incident beam IB to the sample SP. The incident beam IB may be a laser beam generated by the laser irradiation device 110. A detection signal DS may be output from the sample SP to which the incident beam IB is irradiated. The detection signal DS may be a signal including molecular information of the sample SP. For example, the detection signal DS may be light emitted or scattered from the sample SP to which the incident beam IB is irradiated.

The detector 120 may receive the detection signal DS output from the sample SP. The detector 120 may analyze the sample SP based on the received detection signal DS. For example, the detector 120 may detect a signal including information of a virus causing a disease, which is contained in the feces.

In an exemplary embodiment, the detection signal DS may include a reflected signal, a Raman signal, and a noise signal. The detector 120 may obtain molecular information of the sample SP based on the Raman signal included in the detection signal DS.

As described above, according to an embodiment of the inventive concept, by irradiating the incident beam to the sample SP, and by receiving and analyzing the detection signal DS output from the sample SP, the spectroscopic apparatus 100 that analyzes the sample SP may be provided.

Figure 2:
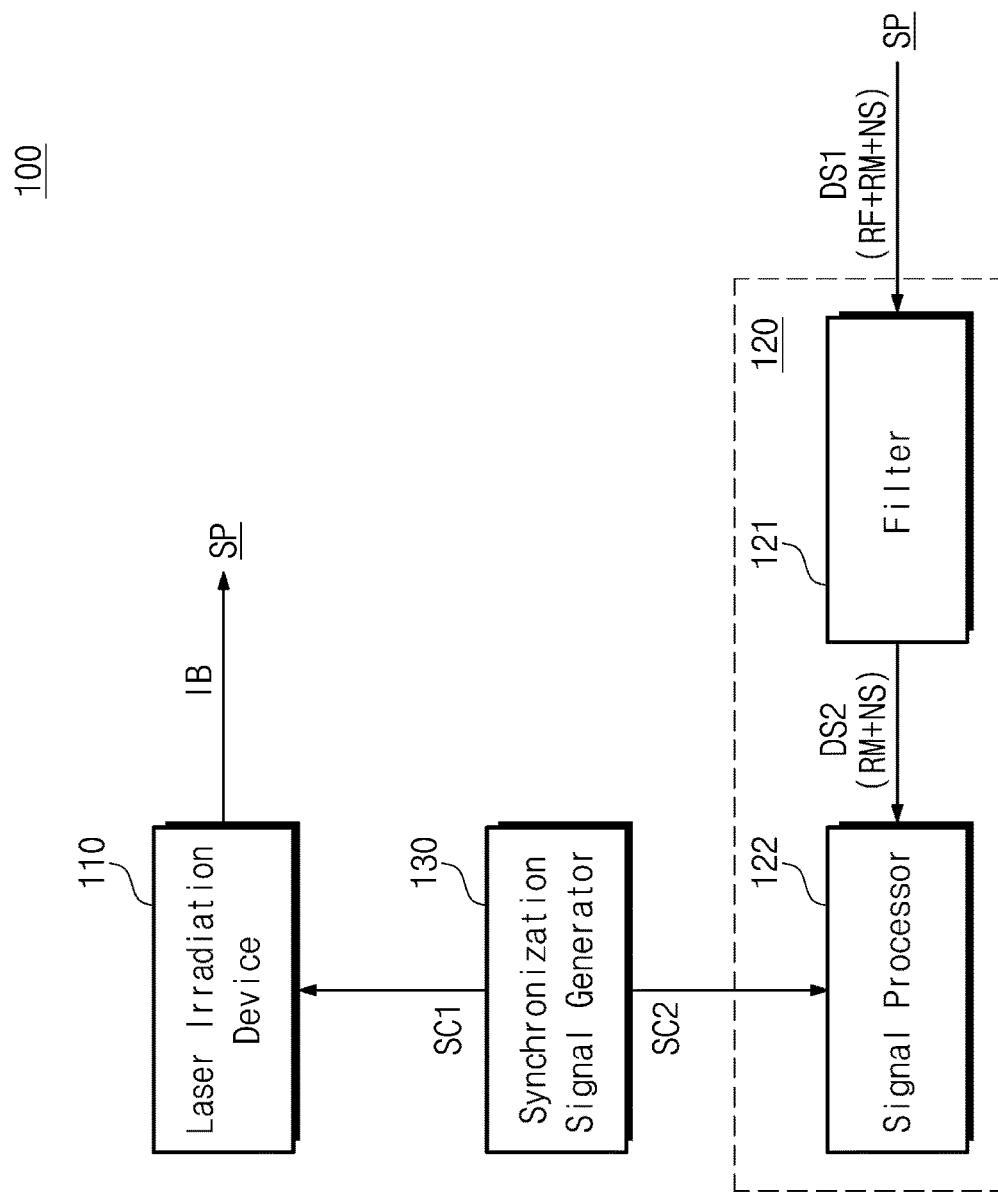
FIG. 2 is a block diagram illustrating a spectroscopic apparatus according to an embodiment of the inventive concept.

FIG. 2 is a block diagram illustrating a spectroscopic apparatus according to an embodiment of the inventive concept. Referring to FIG. 2, the spectroscopic apparatus 100 may include the laser irradiation device 110, the detector 120, and a synchronization signal generator 130.

The synchronization signal generator 130 may output a first synchronization signal SC1 to the laser irradiation device 110. The first synchronization signal SC1 may be a signal that controls a timing at which the laser irradiation device 110 irradiates the incident beam IB. The synchronization signal generator 130 may output a second synchronization signal SC2 to a signal processor 122. The second synchronization signal SC2 may be a signal that controls a timing at which the signal processor 122 processes a second detected signal DS2. That is, the synchronization signal generator 130 may be a device that synchronizes the laser irradiation device 110 with the signal processor 122, based on the synchronization signals SC1 and SC2.

The laser irradiation device 110 may receive the first synchronization signal SC1 from the synchronization signal generator 130. The laser irradiation device 110 may output the incident beam IB to the sample SP at an irradiation time determined based on the first synchronization signal SC1.

The detector 120 may include a filter 121 and the signal processor 122. The filter 121 may receive a first detected signal DS1 output from the sample SP. The first detected signal DS1 may include a reflected signal RF, a Raman signal RM, and a noise signal NS. The filter 121 may output the second detected signal DS2 in which the reflected signal RF is cut off from the first detected signal DS1. The second detected signal DS2 may include the Raman signal RM and the noise signal NS. That is, the filter 121 may be a device that cuts off the reflected signal RF.

In this case, the reflected signal RF may be a signal in which the incident beam IB irradiated to the sample SP is reflected. The reflected signal RF may have the same wavelength as the incident beam IB. The reflected signal RF may be a signal that reaches the detector 120 before the Raman signal RM and the noise signal NS.

In an exemplary embodiment, the Raman signal RM obtained based on the second detected signal DS2 in which the reflected signal RF is cut off may have a greater signal-to-noise ratio (SNR) than the Raman signal obtained based on the first detected signal DS1 before cutting off the reflected signal RF. The signal-to-noise ratio may mean a ratio of the Raman signal RM to the noise signal NS.

The Raman signal RM may be a scattering signal containing the molecular information of the sample SP. The Raman signal RM may be a signal that arrives at the detector 120 later than the reflected signal RF and arrives at the detector 120 before the noise signal NS. The Raman signal RM may have a weaker signal strength than the noise signal NS. The Raman signal RM may have a shorter lifetime than the noise signal NS. The information of the sample SP reconstructed based on the Raman signal RM may have a higher resolution than information of the sample SP reconstructed based on a signal including the noise signal NS.

The noise signal NS may be a signal that interferes with obtaining the molecular information of the sample SP, based on the Raman signal RM. The molecular information of the sample SP obtained based on the Raman signal RM having a low signal-to-noise ratio, which is a ratio of the Raman signal RM to the noise signal NS, may have low resolution and accuracy. For example, the noise signal NS may be a fluorescent noise signal.

The signal processor 122 may receive the second detected signal DS2 from the filter 121. The signal processor 122 may receive the second synchronization signal SC2 from the synchronization signal generator 130. The signal processor 122 may extract the Raman signal RM included in the second detected signal DS2. The signal processor 122 may determine a timing for extracting the Raman signal RM, based on the second synchronization signal SC2.

In an exemplary embodiment, the signal processor 122 may extract the Raman signal RM from the second detected signal DS2 by a time-gated technique. In more detail, the time gated technique may be a technique of discriminating and extracting the Raman signal RM from the second detected signal DS2, based on a feature in which the Raman signal RM reaches the detector 120 before the noise signal NS and the Raman signal RM has a shorter lifetime than the noise signal NS.

As described above, the spectroscopic apparatus 100 according to an embodiment of the inventive concept may be a synchronous spectroscopic apparatus that controls the timing of irradiating the incident beam IB, based on the first synchronization signal SC1, and controls the timing of extracting the Raman signal RM from the second detected signal DS2, based on the second synchronization signal SC2.

Figure 3:
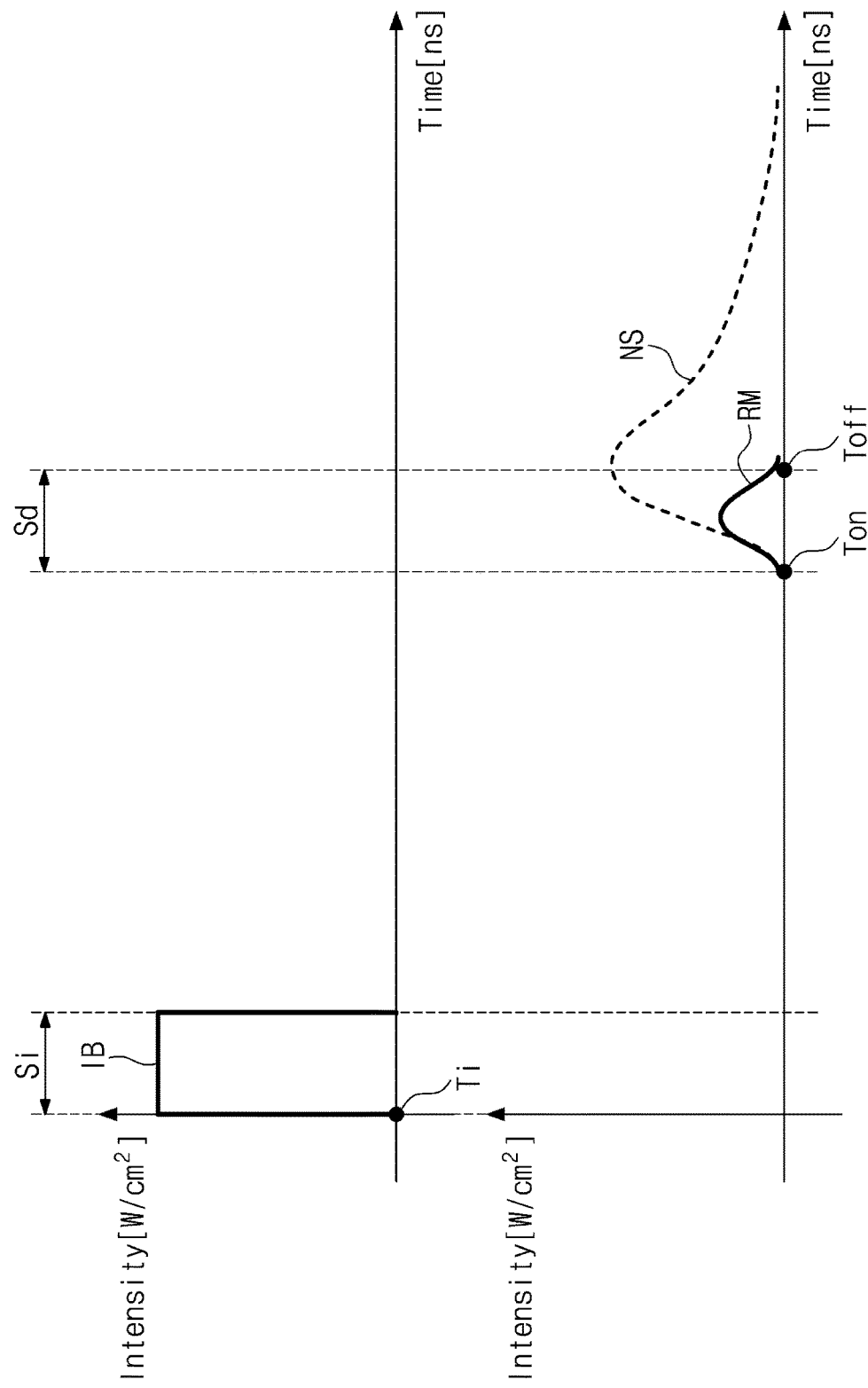
FIG. 3 is a graph illustrating signal dynamics processed by a spectroscopic apparatus of FIG. 2.

FIG. 3 is a graph illustrating signals processed by a spectroscopic apparatus of FIG. 2. For convenience of description, a graph of signals of FIG. 3 is described with reference to the spectroscopic apparatus 100 of FIG. 2. Referring to FIGS. 2 and 3, the incident beam IB irradiated by the laser irradiation device 110, and the Raman signal RM and the noise signal NS included in the second detected signal DS2 that is received to the signal processor 122 are illustrated by way of example.

The laser irradiation device 110 may include information of an irradiation section Si. The irradiation section Si may be a section corresponding to a time at which the incident beam IB is irradiated. The laser irradiation device 110 may determine an irradiation time Ti, based on irradiation timing information included in the first synchronization signal SC1. The irradiation time Ti may be a time for starting irradiation of the incident beam IB. The laser irradiation device 110 may irradiate the incident beam IB to the sample SP for a time corresponding to the irradiation section Si from the irradiation time Ti.

The signal processor 122 may receive the second detected signal DS2. The second detected signal DS2 may include the Raman signal RM and the noise signal NS. The signal processor 122 may include information of a detection section Sd used to measure the second detected signal DS2. The detection section Sd may be a section corresponding to the lifetime of the Raman signal RM. The detection section Sd may be a section measuring characteristics of the sample SP.

The signal processor 122 may determine a measurement start time Ton, based on the detection timing information included in the second synchronization signal SC2. The signal processor 122 may determine a time at which a time corresponding to the detection section Sd elapses from the measurement start time Ton as a measurement end time Toff. The signal processor 122 may measure the second detected signal DS2 from the measurement start time Ton to the measurement end time Toff.

In an exemplary embodiment, as the irradiation section Si and the detection section Sd are decreased, the signal-to-noise ratio, which is the ratio of the Raman signal RM to the noise signal NS, may be increased, compared to CW laser irradiation. For example, when the laser irradiation device 110 irradiates the incident beam IB, which is a high frequency laser beam, and the signal processor 122 extracts the Raman signal RM in a high frequency environment, the molecular information with high resolution and high accuracy may be obtained.

As described above, according to an embodiment of the inventive concept, the spectroscopic apparatus 100 may be provided that determines the irradiation time Ti, based on the irradiation timing information included in the first synchronization signal SC1 and determines the measurement start time Ton, based on the detection timing information included in the second synchronization signal SC2.

Figure 4:
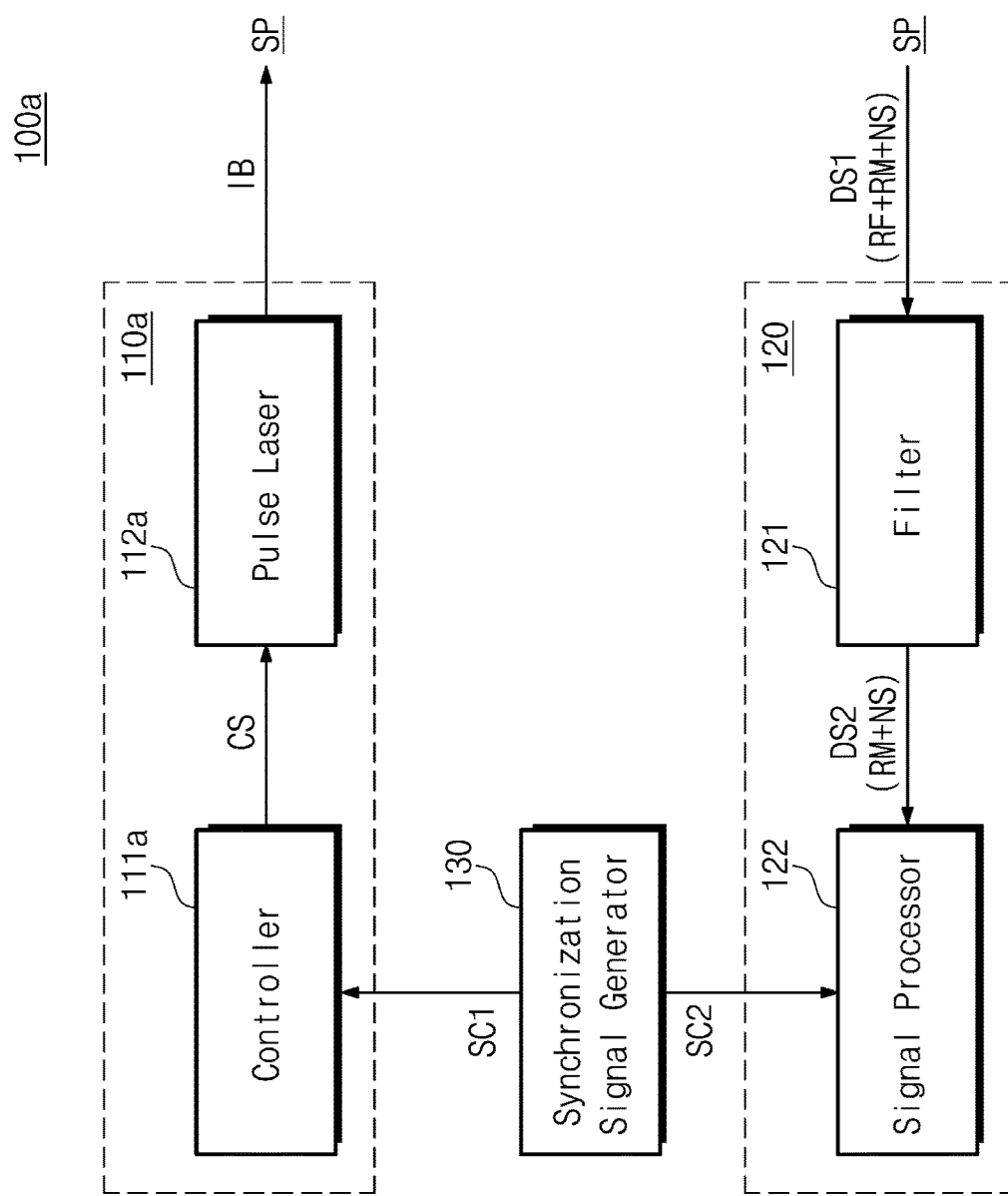
FIG. 4 is a block diagram exemplarily embodying a spectroscopic apparatus of FIG. 2.

FIG. 4 is a block diagram exemplarily embodying a spectroscopic apparatus of FIG. 2. Referring to FIG. 4, a spectroscopic apparatus 100a may include a laser irradiation device 110a, the detector 120, and the synchronization signal generator 130. Since the characteristics of the detector 120 and the synchronization signal generator 130 are similar to those of the detector 120 and the synchronization signal generator 130 of FIG. 2, additional descriptions thereof will be omitted to avoid redundancy.

The laser irradiation device 110a may include a controller 111a and a pulse laser 112a. The controller 111a may receive the first synchronization signal SC1 from the synchronization signal generator 130. The controller 111a may output a control signal CS that controls irradiation of the incident beam IB, based on the first synchronization signal SC1.

The pulse laser 112a may receive the control signal CS from the controller 111a. The pulse laser 112a may irradiate the incident beam IB to the sample SP in response to the control signal CS. In this case, the incident beam IB may be a pulse laser beam. That is, the pulse laser 112a may be a device that outputs the pulse laser beam in response to the control signal CS.

That is, the spectroscopic apparatus 100a according to an embodiment of the inventive concept may be a synchronous spectroscopic apparatus that controls the timing of irradiating the incident beam IB, which is the pulse laser beam, based on the first synchronization signal SC1, and controls the timing of extracting the Raman signal RM, based on the second synchronization signal SC2.

Figure 5:
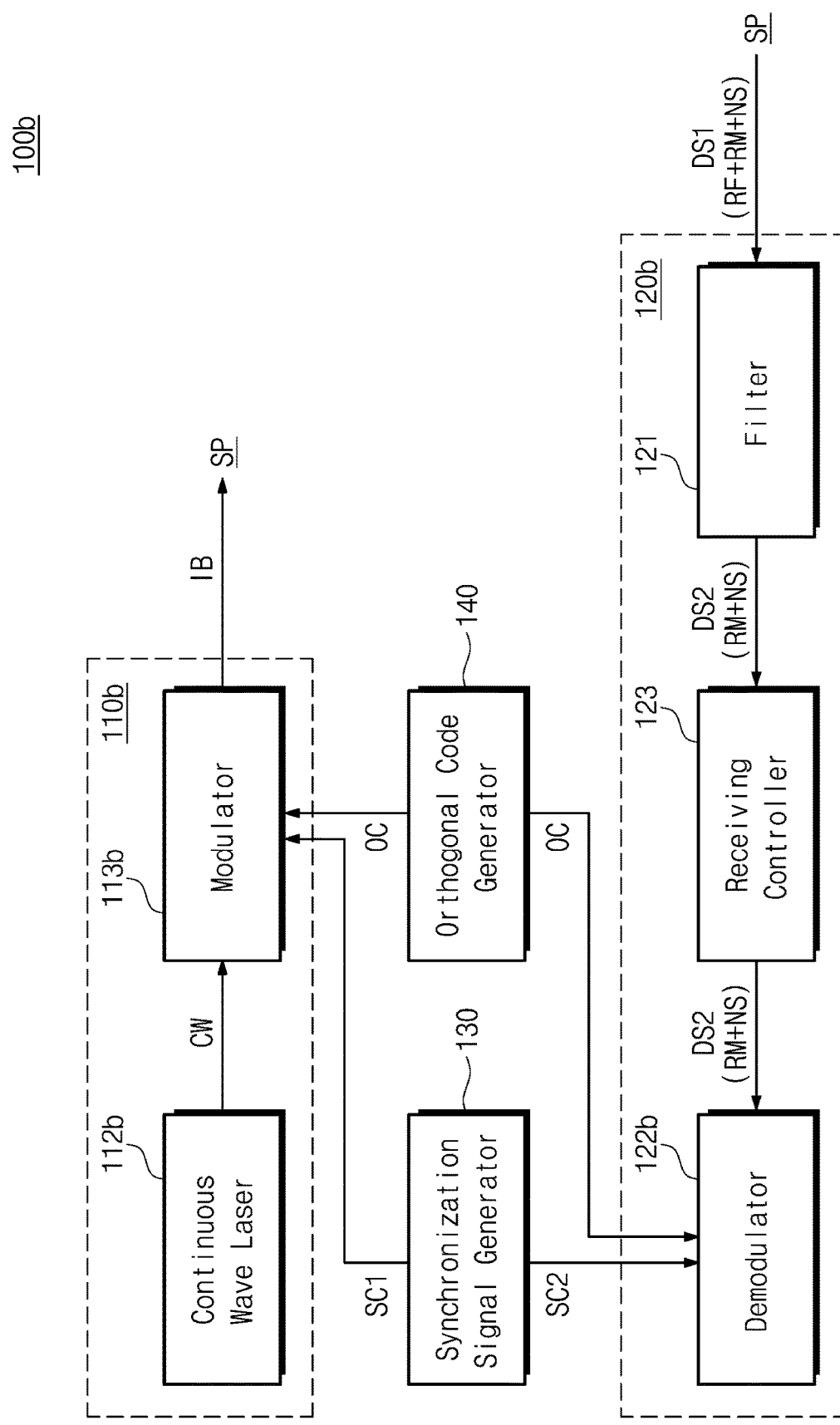
FIG. 5 is a block diagram exemplarily embodying a spectroscopic apparatus of FIG. 2.

FIG. 5 is a block diagram exemplarily embodying a spectroscopic apparatus of FIG. 2. Referring to FIG. 5, a spectroscopic apparatus 100b may include a laser irradiation device 110b, a detector 120b, the synchronization signal generator 130, and an orthogonal code generator 140. Since the characteristics of the filter 121 and the synchronization signal generator 130 are similar to those of the filter 121 and the synchronization signal generator 130 of FIG. 2, additional descriptions thereof will be omitted to avoid redundancy.

The orthogonal code generator 140 may generate an orthogonal code OC. The orthogonal code generator 140 may output the generated orthogonal code OC to the laser irradiation device 110b and the detector 120b.

In this case, the orthogonal code OC may be a code that is mathematically orthogonal to other codes. The orthogonal code OC may include a plurality of bits corresponding to a series of numbers. Each of the bits included in the orthogonal code OC may have a value of '1' or a value of '0'.

The laser irradiation device 110b may include a continuous wave laser 112b and a modulator 113b. The continuous wave laser 112b may generate and output a continuous wave laser beam CW. The continuous wave laser beam CW may be a laser beam in which the intensity of output over time is uniform.

The modulator 113b may receive the continuous wave laser beam CW from the continuous wave laser 112b. The modulator 113b may receive the first synchronization signal SC1 from the synchronization signal generator 130. The modulator 113b may receive the orthogonal code OC from the orthogonal code generator 140. The modulator 113b may irradiate the incident beam IB modulated from the continuous wave laser beam CW to the sample SP, based on the orthogonal code OC. The timing at which the modulator 113b modulates the continuous wave laser beam CW and irradiates the incident beam IB may be determined based on the first synchronization signal SC1.

In an exemplary embodiment, the modulator 113b may irradiate the incident beam IB including pulse laser beams that are generated based on the orthogonal code OC. For example, the orthogonal code OC may include a series of bits. The modulator 113b may irradiate the pulse laser beam modulated from the continuous wave laser beam CW in a time section corresponding to a bit having the value of '1'. The modulator 113b may not irradiate the pulse laser beam at a time section corresponding to a bit having the value of '0'.

The detector 120b may include the filter 121, a demodulator 122b, and a receiving controller 123. The receiving controller 123 may convert the second detected signal DS2, which is the laser beam received from the filter 121, into the second detected signal DS2, which is an electrical signal that can be demodulated by the demodulator 122b. The receiving controller 123 may output the converted second detected signal DS2 to the demodulator 122b.

The demodulator 122b may receive the second synchronization signal SC2 from the synchronization signal generator 130. The demodulator 122b may receive the orthogonal code OC from the orthogonal code generator 140. The demodulator 122b may receive the second detected signal DS2 from the receiving controller 123. The demodulator 122b may demodulate the second detected signal DS2, based on the orthogonal code OC to extract the Raman signal RM. The timing at which the demodulator 122b demodulates the second detected signal DS2 may be determined based on the second synchronization signal SC2.

For example, the demodulator 122b may include demodulation section information. The demodulator 122b may demodulate the second detected signal DS2 with the orthogonal code OC during a demodulation section from a time determined based on the second synchronization signal SC2. By selectively demodulating the second detected signal DS2 in a time section in which the intensity of the Raman signal RM is predominant in the second detected signal DS2, the demodulator 122b that extracts the Raman signal RM may be provided.

In an exemplary embodiment, the receiving controller 123 may be omitted. In this case, the demodulator 122b may directly receive the second detected signal DS2, which is the laser beam, from the filter 121. The demodulator 122b may extract the Raman signal RM from the second detected signal DS2, which is the laser beam, based on the orthogonal code OC and the second synchronization signal SC2.

According to an embodiment of the inventive concept, by demodulating based on a correlation with the orthogonal code OC, the demodulator 122b may be provided that has an improved the signal-to-noise ratio, which is the ratio of the Raman signal RM to the noise signal NS.

For example, the Raman signal RM that is obtained by irradiating the incident beam IB modulated to an arbitrary code that does not have a mathematical orthogonality to other codes and by demodulating the second detected signal DS2 based on the correlation with the arbitrary code may have a low signal-to-noise ratio. The Raman signal RM that is obtained by irradiating the incident beam IB modulated to the orthogonal code and by demodulating the second detected signal DS2 based on the correlation with the orthogonal code may have a high signal-to-noise ratio.

In an exemplary embodiment, as the modulation frequency and the demodulation frequency increase, the signal-to-noise ratio may be improved. For example, when the modulator 113b modulates the continuous wave laser beam CW at a high frequency, and the demodulator 122b demodulates the second detected signal DS2 at a high frequency, the signal-to-noise ratio, which is the ratio of the Raman signal RM to the noise signal NS, may be improved.

As described above, the spectroscopic apparatus 100b according to an embodiment of the inventive concept may be a synchronous spectroscopic apparatus that controls the timing of modulating the continuous wave laser beam CW, based on the first synchronization signal SC1, and controls the timing of demodulating the second detected signal DS2, based on the second synchronization signal SC2.

Figure 6:
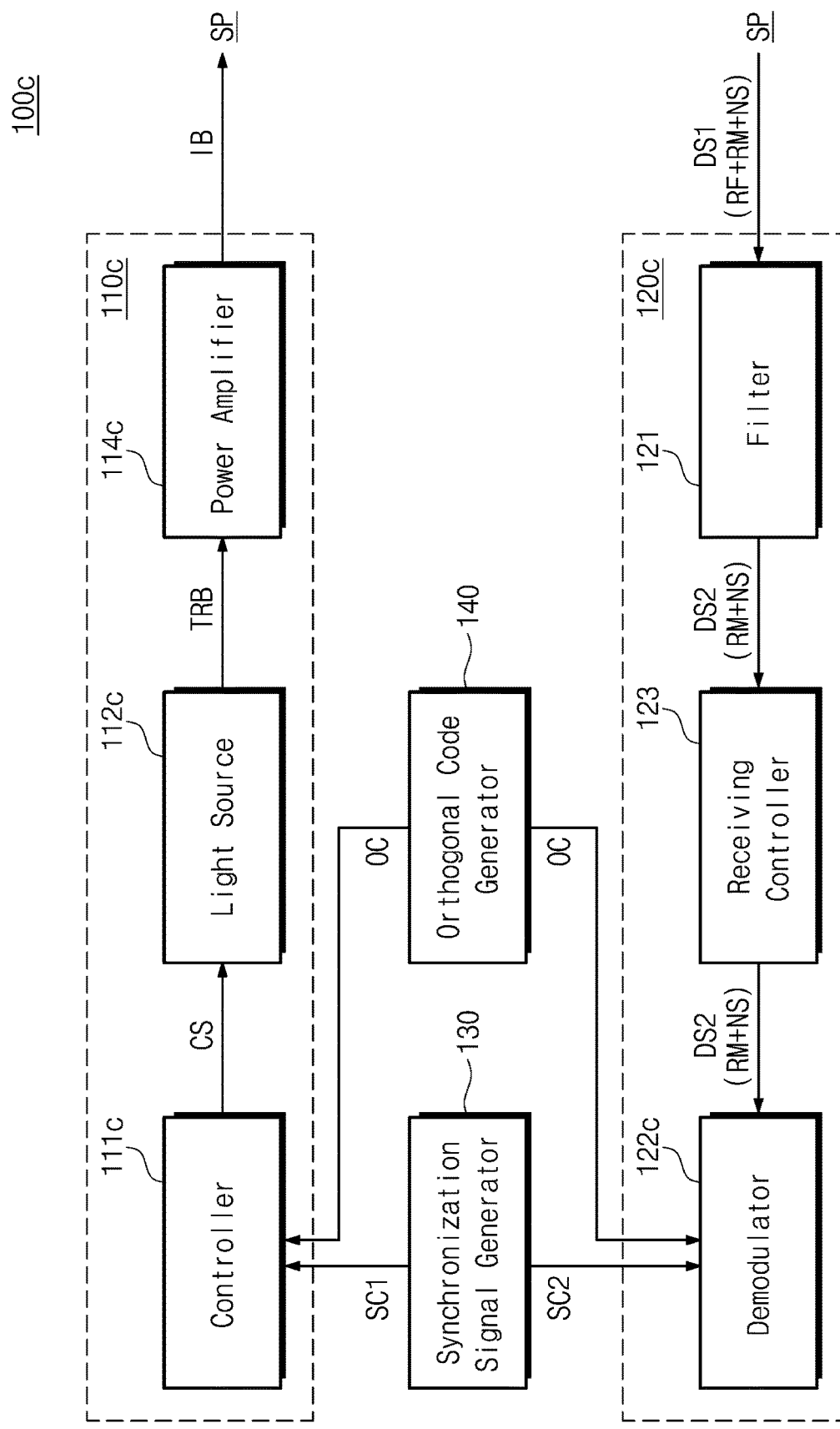
FIG. 6 is a block diagram exemplarily embodying a spectroscopic apparatus of FIG. 2.

FIG. 6 is a block diagram exemplarily embodying a spectroscopic apparatus of FIG. 2. Referring to FIG. 6, a spectroscopic apparatus 100c may include a laser irradiation device 110c, a detector 120c, the synchronization signal generator 130, and the orthogonal code generator 140. Since the characteristics of the detector 120c, the synchronization signal generator 130, and the orthogonal code generator 140 are similar to those of the detector 120b, the synchronization signal generator 130, and the orthogonal code generator 140 of FIG. 5, additional descriptions thereof will be omitted to avoid redundancy.

The laser irradiation device 110c may include a controller 111c, a light source 112c, and a power amplifier 114c. The controller 111c may receive the first synchronization signal SC1 from the synchronization signal generator 130. The controller 111c may receive the orthogonal code OC from the orthogonal code generator 140. The controller 111c may output the control signal CS, based on the first synchronization signal SC1 and the orthogonal code OC.

In more detail, the control signal CS may be a signal that allows the light source 112c to output a time-resolved beam TRB from a time determined based on the first synchronization signal SC1. The control signal CS may be a signal that allows the light source 112c to output the pulse laser beam in a section corresponding to a bit having the value of '1' among a series of bits included in the orthogonal code OC. The control signal CS may be a signal that allows the light source 112c not to output the pulse laser beam in a section corresponding to a bit having the value of '0' among the series of bits included in the orthogonal code OC. The time-resolved beam TRB may include a pulse output based on the orthogonal code OC.

The light source 112c may receive the control signal CS from the controller 111c. The light source 112c may output the time-resolved beam TRB in response to the control signal CS. In an exemplary embodiment, the light source 112c may be a device that outputs a high frequency pulse laser beam. The high frequency pulse laser beam may be a laser beam having a short time section corresponding to a wavelength. For example, the light source 112c may be a distributed feedback laser diode.

That is, unlike the case where the modulator 113b of FIG. 5 modulates the continuous wave laser beam CW at the high frequency, since the light source 112c receiving the control signal CS directly outputs the high frequency pulse laser beam, the laser irradiation device 110c that outputs the high frequency pulse laser beam may be provided without having a burden of modulating the continuous wave laser beam at a high frequency.

The power amplifier 114c may receive the time-resolved beam TRB from the light source 112c. The power amplifier 114c may irradiate the sample SP with the incident beam IB obtained by amplifying the time-resolved beam TRB. That is, the power amplifier 114c may be a device that amplifies the time-resolved beam TRB output from the light source 112c.

As described above, the spectroscopic apparatus 100c according to an embodiment of the inventive concept may be a synchronous spectroscopic apparatus that controls the timing at which the light source 112c outputs the time-resolved beam TRB, based on the first synchronization signal SC1 and the orthogonal code OC, and controls the timing of demodulating the second detected signal DS2, based on the second synchronization signal SC2.

In addition, according to an embodiment of the inventive concept, by directly controlling the light source 112c that generates the time-resolved beam TRB, a synchronous spectroscopic apparatus may be provided that irradiates the incident beam IB having a waveform similar to a high frequency modulated laser beam without a separate modulation module.

Figure 7:
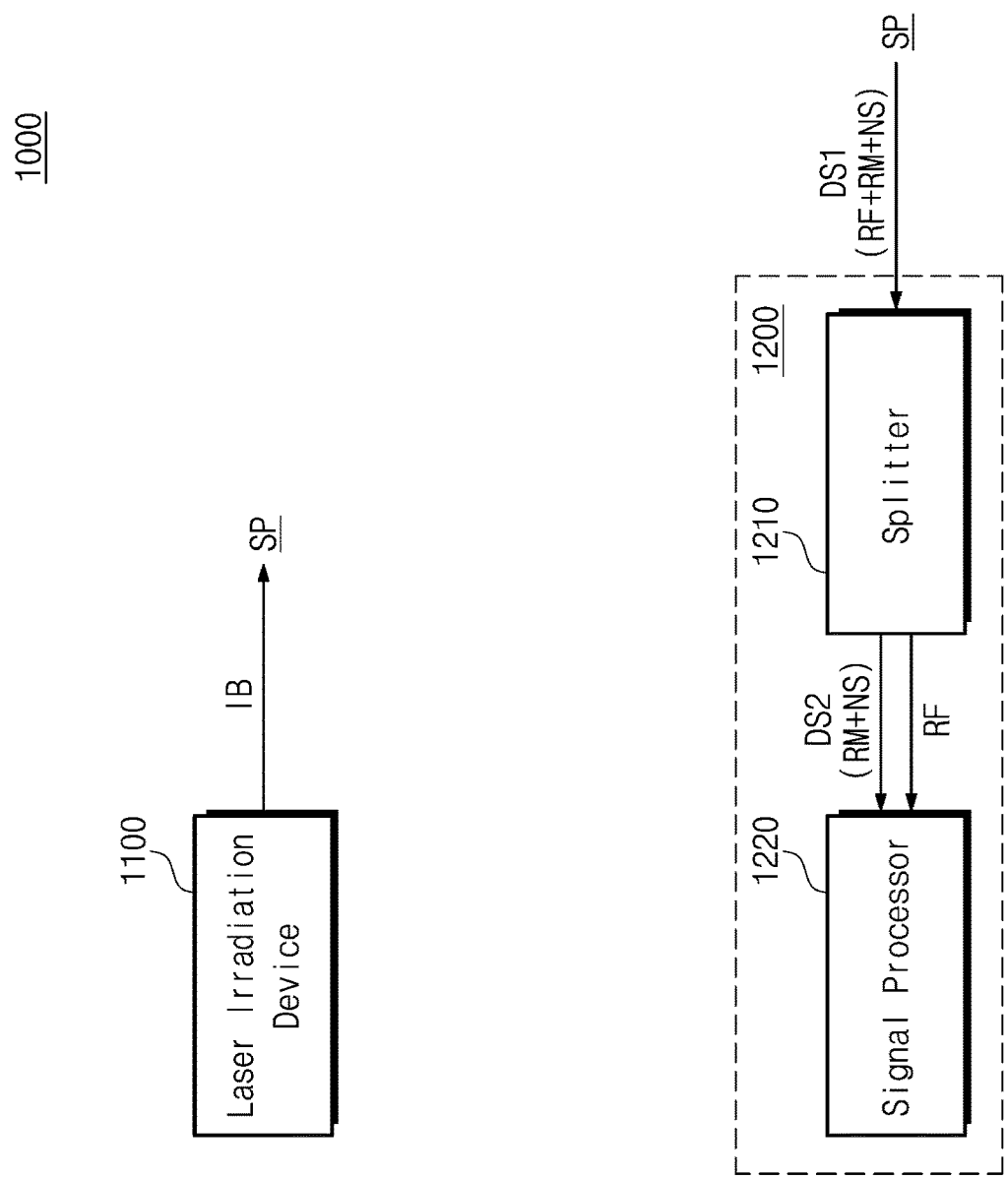
FIG. 7 is a block diagram illustrating a spectroscopic apparatus according to an embodiment of the inventive concept.

FIG. 7 is a block diagram illustrating a spectroscopic apparatus according to an embodiment of the inventive concept. Referring to FIG. 7, a spectroscopic apparatus 1000 may include a laser irradiation device 1100 and a detector 1200.

The laser irradiation device 1100 may irradiate the incident beam IB to the sample SP. Unlike the laser irradiation device 110 of FIG. 2, the laser irradiation device 1100 may irradiate the incident beam IB without control of a module that synchronizes with the detector 1200. Accordingly, a precise control may not be required with respect to the timing at which the laser irradiation device 1100 irradiates the incident beam IB.

The detector 1200 may include a splitter 1210 and a signal processor 1220. The splitter 1210 may receive the first detected signal DS1 output from the sample SP. The splitter 1210 may split and output the reflected signal RF included in the first detected signal DS1. The splitter 1210 may output the second detected signal DS2 that is a signal excluding the reflected signal RF from the first detected signal DS1. The second detected signal DS2 may include the Raman signal RM and the noise signal NS. The reflected signal RF has the same frequency as the incident beam IB, but the Raman signal RM has a different frequency than the incident beam IB. Accordingly, the splitter 1210 may be a beam splitter that splits the reflected signal RF and the second detected signal DS2 from the first detected signal DS1.

The signal processor 1220 may receive the second detected signal DS2 and the reflected signal RF from the splitter 1210. The signal processor 1220 may extract the Raman signal RM included in the second detected signal DS2. The signal processor 1220 may determine the timing of extracting the Raman signal RM, based on the reflected signal RF.

In this case, unlike the signal processor 122 of FIG. 2, the signal processor 1220 may extract the Raman signal RM from the second detected signal DS2 without control of a module that synchronizes with the laser irradiation device 1100.

According to an embodiment of the inventive concept, the signal processor 1220 may be provided that extracts the Raman signal RM using the reflected signal RF as a trigger. For example, the Raman signal RM may have a short lifetime in units of a nanosecond. The signal processor of a synchronous spectroscopic apparatus (e.g., the spectroscopic apparatus 100 of FIG. 2) may require the precise control in units of the nanosecond for synchronization with a laser irradiation device. In contrast, the signal processor 1220 may determine the timing of processing the second detected signal DS2 without synchronization with the laser irradiation device 1100, by splitting the reflected signal RF included in the first detected signal DS1 and using the splitted reflected signal RF as a trigger signal.

That is, the spectroscopic apparatus 1000 according to an embodiment of the inventive concept may be an asynchronous spectroscopic apparatus that determines the timing of processing the signal DS2 using the reflected signal RF splitted without a separate module that synchronizes the laser irradiation device 1100 with the detector 1200 as the trigger.

Figure 8:
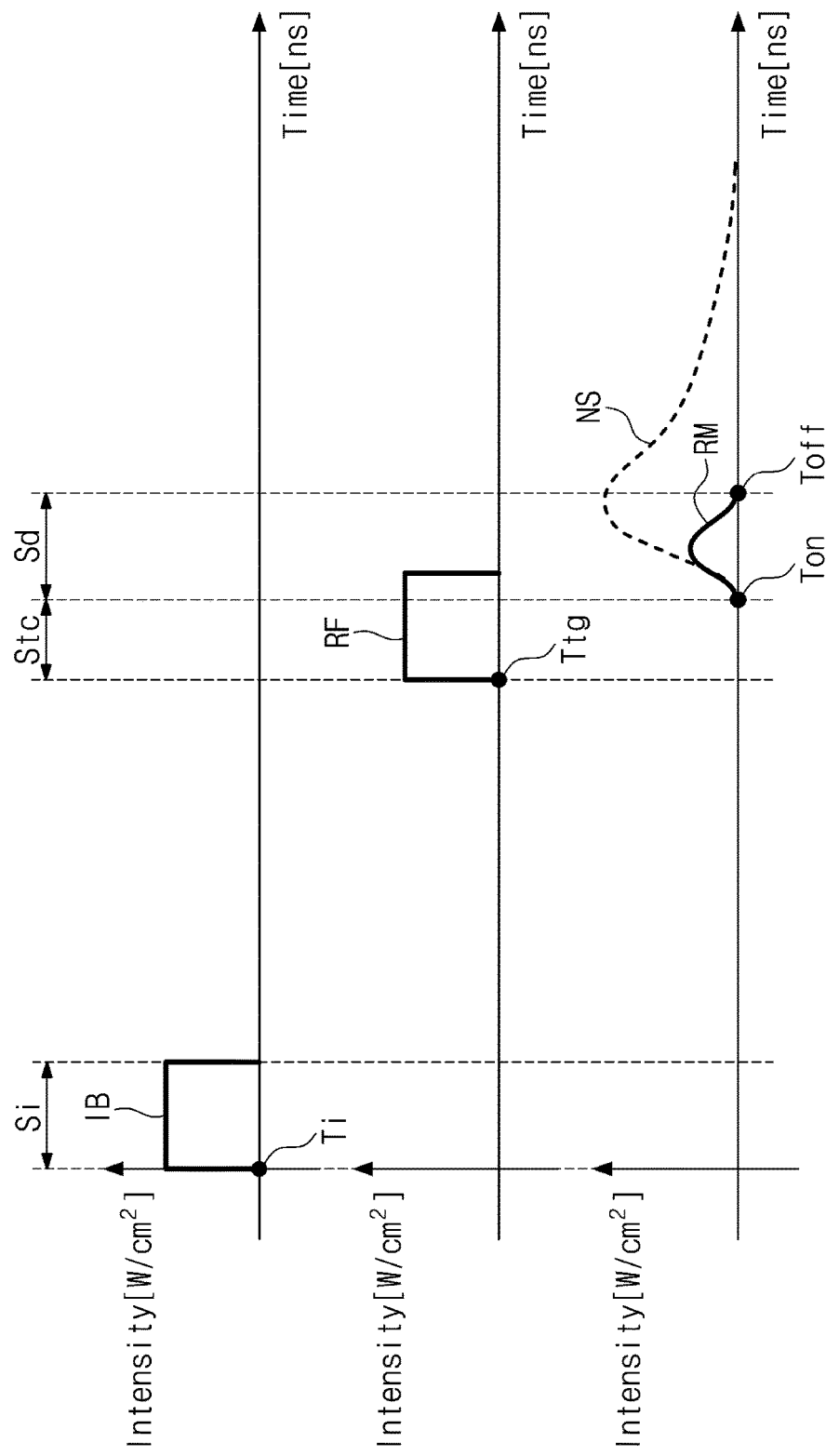
FIG. 8 is a graph illustrating signal dynamics processed by a spectroscopic apparatus of FIG. 7.

FIG. 8 is a graph illustrating signal dynamics processed by a spectroscopic apparatus of FIG. 7. For convenience of description, a graph of signals in FIG. 8 is described with reference to the spectroscopic apparatus 1000 of FIG. 7. Referring to FIGS. 7 and 8, the incident beam IB irradiated by the laser irradiation device 1100, the reflected signal RF received to the signal processor 1220, and the Raman signal RM and noise signal NS that are included in the second detected signal DS2 are illustrated.

The laser irradiation device 1100 may include information of the irradiation section Si in which the incident beam IB is irradiated and information of the irradiation time Ti at which the incident beam IB is irradiated. The irradiation section Si may be a section corresponding to a time for irradiating the incident beam IB. The irradiation time Ti may be a time for starting irradiation of the incident beam IB. The laser irradiation device 1100 may irradiate the incident beam IB to the sample SP for a time corresponding to the irradiation section Si from the irradiation time Ti.

The signal processor 1220 may receive the reflected signal RF. The signal processor 1220 may determine a time at which the reflected signal RF is received as a trigger time Ttg. The signal processor 1220 may include information of a timing control section Stc corresponding to a difference in reception time between the reflected signal RF and the Raman signal RM. The signal processor 1220 may determine a time after the timing control section Stc from the trigger time Ttg as the measurement start time Ton.

The signal processor 1220 may receive the second detected signal DS2. The signal processor 1220 may include information of the detection section Sd measuring the second detected signal DS2. The signal processor 1220 may determine a time at which the time corresponding to the detection section Sd is elapsed from the measurement start time Ton as the measurement end time Toff. The signal processor 1220 may measure the second detected signal DS2 from the measurement start time Ton to the measurement end time Toff.

As described above, according to an embodiment of the inventive concept, the spectroscopic apparatus 1000 may be provided that determines a measurement start time Ton, based on the trigger time Ttg at which the reflected signal RF is received.

Figure 9:
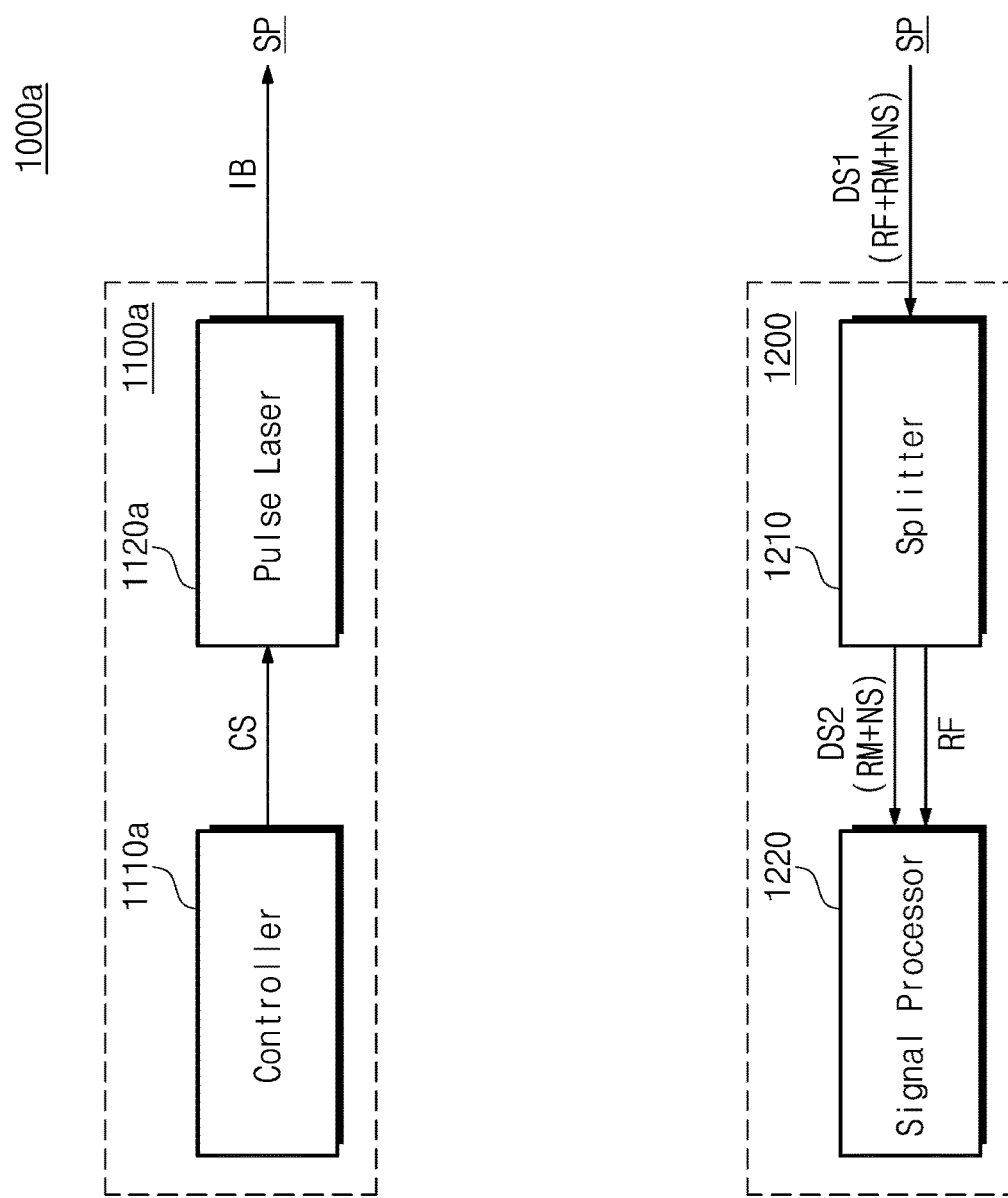
FIG. 9 is a block diagram exemplarily embodying a spectroscopic apparatus of FIG. 7.

FIG. 9 is a block diagram exemplarily embodying a spectroscopic apparatus of FIG. 7. Referring to FIG. 9, a spectroscopic apparatus 1000*a* may include a laser irradiation device 1100*a* and the detector 1200. Since the characteristics of the detector 1200 are similar to those of the detector 1200 of FIG. 7, the characteristics of a pulse laser 1120*a* are similar to those of the pulse laser 112*a* of FIG. 4, additional descriptions thereof will be omitted to avoid redundancy.

The laser irradiation device 1100*a* may include a controller 1110*a* and the pulse laser 1120*a*. The controller 1110*a* may output the control signal CS that controls irradiation of the incident beam IB. Unlike the controller 111*a* of FIG. 4, the controller 1110*a* may determine the timing of starting irradiation of the incident beam IB without control of a separate synchronization module (e.g., the synchronization signal generator 130 of FIG. 4).

That is, the spectroscopic apparatus 1000*a* according to an embodiment of the inventive concept may be an asynchronous spectroscopic apparatus that irradiates the incident beam IB, which is the pulse laser beam through the laser irradiation device 1100*a*, and controls the timing of extracting the Raman signal RM by using the reflected signal RF splitted by the splitter 1210 as the trigger.

Figure 10:
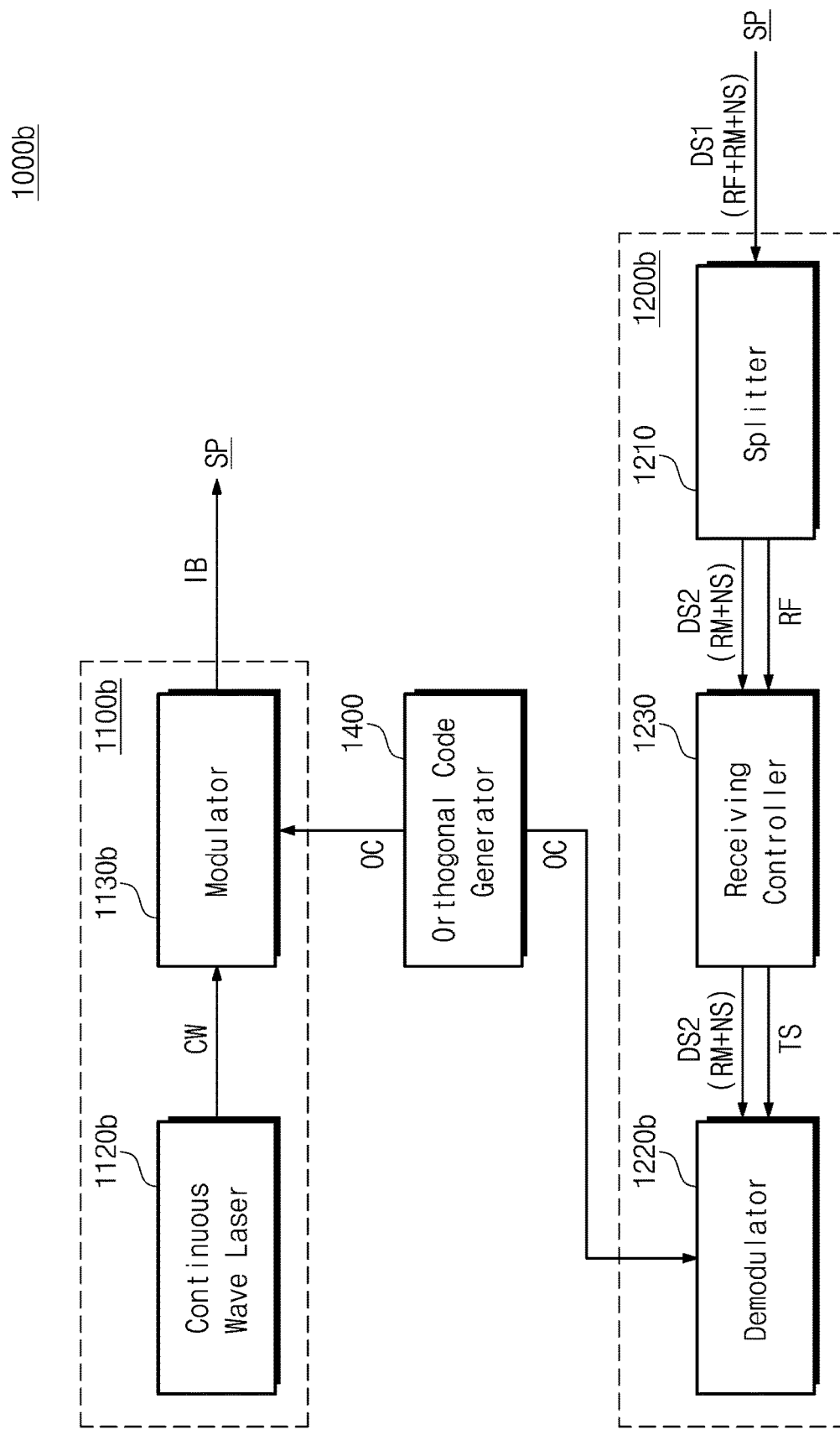
FIG. 10 is a block diagram exemplarily embodying a spectroscopic apparatus of FIG. 7.

FIG. 10 is a block diagram exemplarily embodying a spectroscopic apparatus of FIG. 7. Referring to FIG. 10, a spectroscopic apparatus 1000*b* may include a laser irradiation device 1100*b*, a detector 1200*b*, and an orthogonal code generator 1400. Since the characteristics of a continuous wave laser 1120*b* and the orthogonal code generator 1400 are similar to those of the continuous wave laser 112*b* and the orthogonal code generator 140 of FIG. 5, additional descriptions thereof will be omitted to avoid redundancy.

The laser irradiation device 1100*b* may include the continuous wave laser 1120*b* and a modulator 1130*b*. The modulator 1130*b* may receive the continuous wave laser beam CW from the continuous wave laser 1120*b*. The modulator 1130*b* may receive the orthogonal code OC from the orthogonal code generator 1400. The modulator 1130*b* may irradiate the sample SP with the incident beam IB obtained by modulating the continuous wave laser beam CW based on the orthogonal code OC.

In this case, unlike the modulator 113*b* of FIG. 5, the modulator 1130*b* may determine the timing of irradiating the incident beam IB by modulating the continuous wave laser beam CW without control of a separate synchronization module (e.g., the synchronization signal generator 130 of FIG. 5).

The detector 1200*b* may include the splitter 1210, a demodulator 1220*b*, and a receiving controller 1230. The splitter 1210 may separate the first detected signal DS1 into the second detected signal DS2 and the reflected signal RF and may separate the second detected signal DS2 and the reflected signal RF.

The receiving controller 1230 may receive the second detected signal DS2 and the reflected signal RF from the splitter 1210. The receiving controller 1230 may convert the second detected signal DS2, which is the laser beam, to the second detected signal DS2, which is the electrical signal that can be demodulated by the demodulator 1220*b* and may output the converted second detected signal DS2. The receiving controller 1230 may output a trigger signal TS that controls the timing at which the demodulator 1220*b* processes the second detected signal DS2 based on the reflected signal RF.

The demodulator 1220*b* may receive the second detected signal DS2 and the trigger signal TS from the receiving controller 1230. The demodulator 1220*b* may receive the orthogonal code OC from the orthogonal code generator 1400. The demodulator 1220*b* may demodulate the second detected signal DS2 based on the orthogonal code OC to extract the Raman signal RM. The timing at which the demodulator 1220*b* demodulates the second detected signal DS2 may be determined based on the trigger signal TS.

For example, the demodulator 1220*b* may include demodulation section information. The demodulator 1220*b* may demodulate the second detected signal DS2 with the orthogonal code OC during the demodulation section from a time determined based on the trigger signal TS.

As described above, the spectroscopic apparatus 1000*b* according to an embodiment of the inventive concept may be an asynchronous spectroscopic apparatus that irradiates the incident beam IB obtained by modulating the continuous wave laser beam CW with the orthogonal code OC through the laser irradiation device 1100*b*, and controls the timing of demodulating the second detected signal DS2 by using the reflected signal RF splitted by the splitter 1210 as the trigger.

Figure 11:
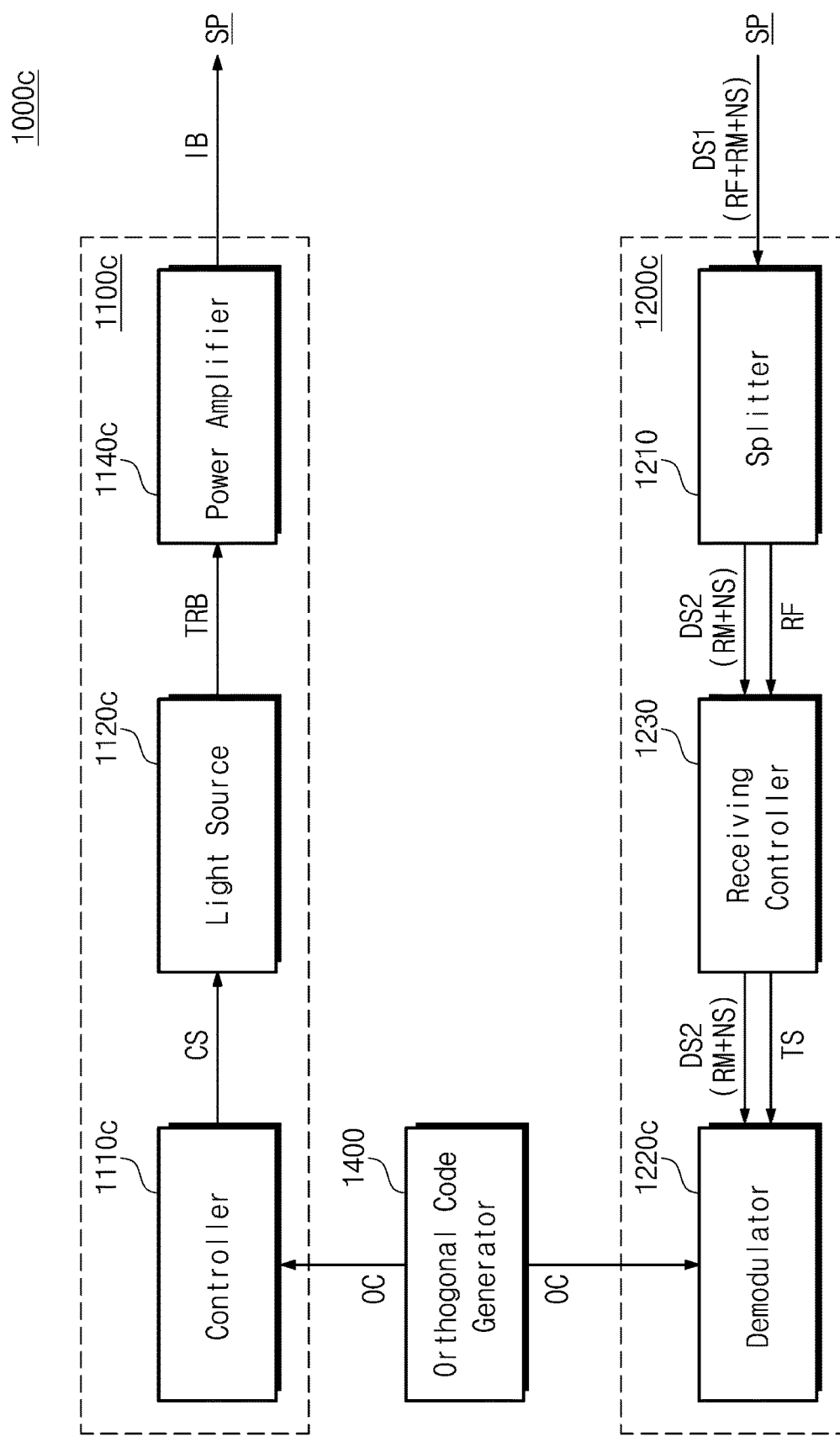
FIG. 11 is a block diagram exemplarily embodying a spectroscopic apparatus of FIG. 7.

FIG. 11 is a block diagram exemplarily embodying a spectroscopic apparatus of FIG. 7. Referring to FIG. 11, a spectroscopic apparatus 1000*c* may include a laser irradiation device 1100*c*, a detector 1200*c*, and the orthogonal code generator 1400. Since the characteristics of the detector 1200*c* and the orthogonal code generator 1400 are similar to those of the detector 1200*b* and the orthogonal code generator 1400 of FIG. 10, and the characteristics of a light source 1120*c* and a power amplifier 1140*c* are similar to those of the light source 112*c* and the power amplifier 114*c* in FIG. 6, additional descriptions of thereof will be omitted to avoid redundancy.

The laser irradiation device 1100c may include a controller 1110c, the light source 1120c, and the power amplifier 1140c. The controller 1110c may receive the orthogonal code OC from the orthogonal code generator 1400. The controller 1110c may output the control signal CS based on the orthogonal code OC. The control signal CS may be a signal for controlling the light source 1120c outputting the time-resolved beam TRB.

In this case, unlike the controller 111c of FIG. 6, the controller 1110c may determine the timing at which the light source 1120c outputs the time-resolved beam TRB without control of a separate synchronization module (e.g., the synchronization signal generator 130 of FIG. 6).

As described above, the spectroscopic apparatus 1000c according to an embodiment of the inventive concept may be an asynchronous spectroscopic apparatus that allows the light source 1120c to output the time-resolved beam TRB including the information of the orthogonal code OC, and controls the timing of demodulating the second detected signal DS2 by using the reflected signal RF splitted by the splitter 1210 as the trigger.

In addition, according to an embodiment of the inventive concept, by directly controlling the light source 1120c generating the time-resolved beam TRB, an asynchronous spectroscopic apparatus may be provided that irradiates the incident beam IB having a waveform similar to a laser beam modulated at a high frequency without a separate modulation module.

Figure 12:
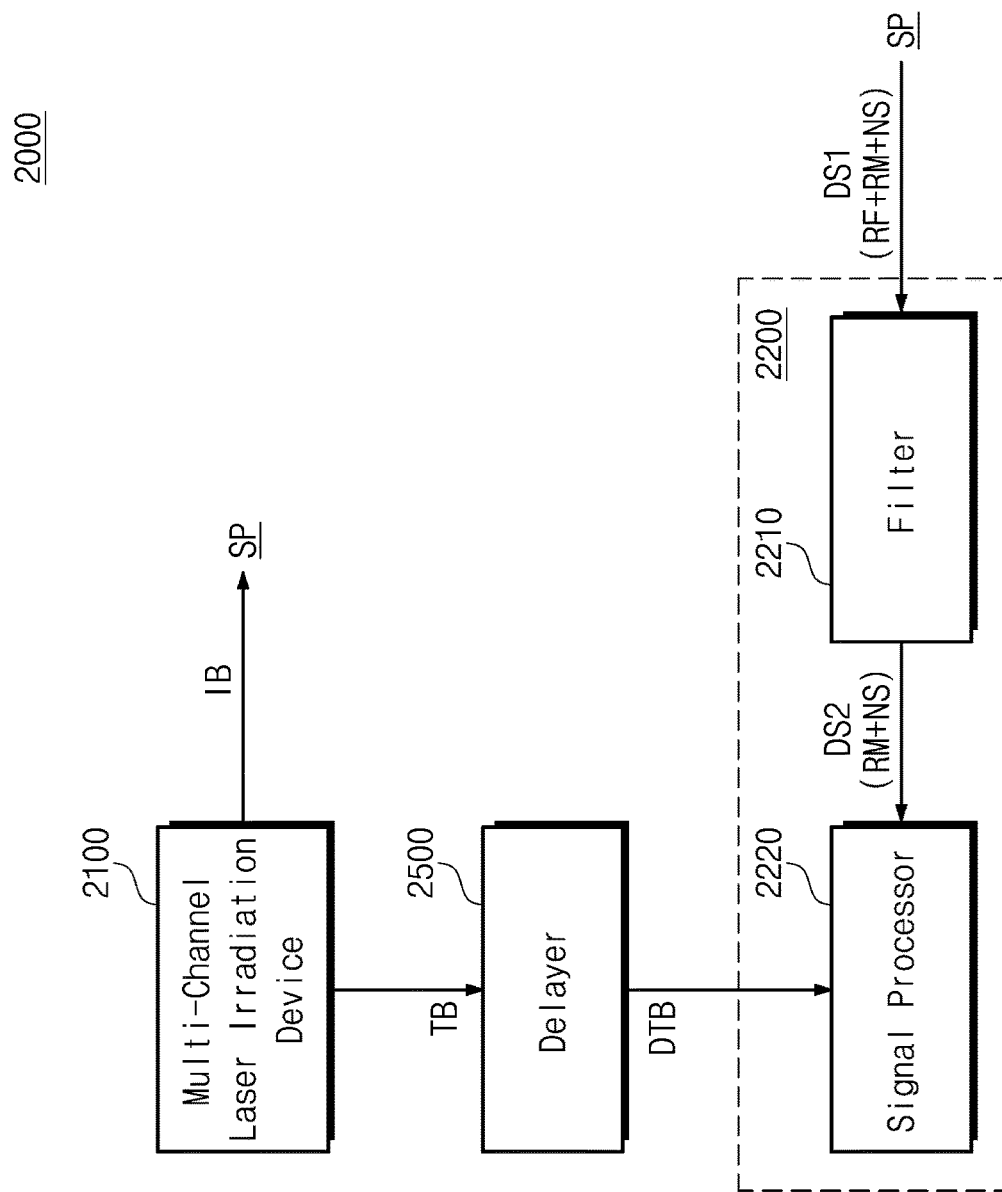
FIG. 12 is a block diagram illustrating a spectroscopic apparatus according to an embodiment of the inventive concept.

FIG. 12 is a block diagram illustrating a spectroscopic apparatus according to an embodiment of the inventive concept. Referring to FIG. 12, a spectroscopic apparatus 2000 may include a multi-channel laser irradiation device 2100, a detector 2200, and a delay element 2500.

The multi-channel laser irradiation device 2100 may generate the incident beam IB and a trigger beam TB. The multi-channel laser irradiation device 2100 may irradiate the incident beam IB to the sample SP. The multi-channel laser irradiation device 2100 may output the trigger beam TB. The trigger beam TB may be another laser beam that controls the timing at which a signal processor 2220 processes the second detected signal DS2.

In this case, unlike the laser irradiation device 110 of FIG. 2, the multi-channel laser irradiation device 2100 may irradiate the incident beam IB without control of a module that synchronizes with the detector 2200. Accordingly, a precise control with respect to the timing at which the multi-channel laser irradiation device 2100 irradiates the incident beam IB may not be required.

In an exemplary embodiment, characteristics of the incident beam IB and the trigger beam TB output from the multi-channel laser irradiation device 2100 may be different from each other. For example, a wavelength of the incident beam IB may be different from a wavelength of the trigger beam TB. Alternatively, a frequency of the incident beam IB may be different from a frequency of the trigger beam TB.

The delay element 2500 may receive the trigger beam TB from the multi-channel laser irradiation device 2100. The delay element 2500 may output a trigger beam DTB delayed by a delay time. The delay time may be a preset time based on a difference between a time at which the incident beam IB is irradiated and a time at which the Raman signal RM included in the first detected signal DS1 reaches the signal processor 2220. That is, the delay time may be a time calculated in advance by predicting a time required for the Raman signal RM to reach the detector 2200.

The detector 2200 may include a filter 2210 and the signal processor 2220. The filter 2210 may receive the first detected signal DS1 output from the sample SP. The filter 2210 may output the second detected signal DS2 in which the reflected signal RF is cut off from the first detected signal DS1. The second detected signal DS2 may include the Raman signal RM and the noise signal NS.

The signal processor 2220 may receive the second detected signal DS2 from the filter 2210. The signal processor 2220 may receive the delayed trigger beam DTB from the delay element 2500. The signal processor 2220 may extract the Raman signal RM included in the second detected signal DS2. The signal processor 2220 may determine the timing of extracting the Raman signal RM, based on the delayed trigger beam DTB.

According to an embodiment of the inventive concept, the signal processor 2220 may be provided that extracts the Raman signal RM by using the trigger beam DTB delayed by the delay time as the trigger. Unlike a signal processor (e.g., the signal processor 122 of FIG. 2) of the synchronous spectroscopic apparatus, in which the precise control in units of the nanosecond is required for synchronization with a laser irradiation device, the signal processor 2220 may determine the timing of processing the second detected signal DS2 by utilizing the delayed trigger beam DTB as the trigger signal.

Figure 13:
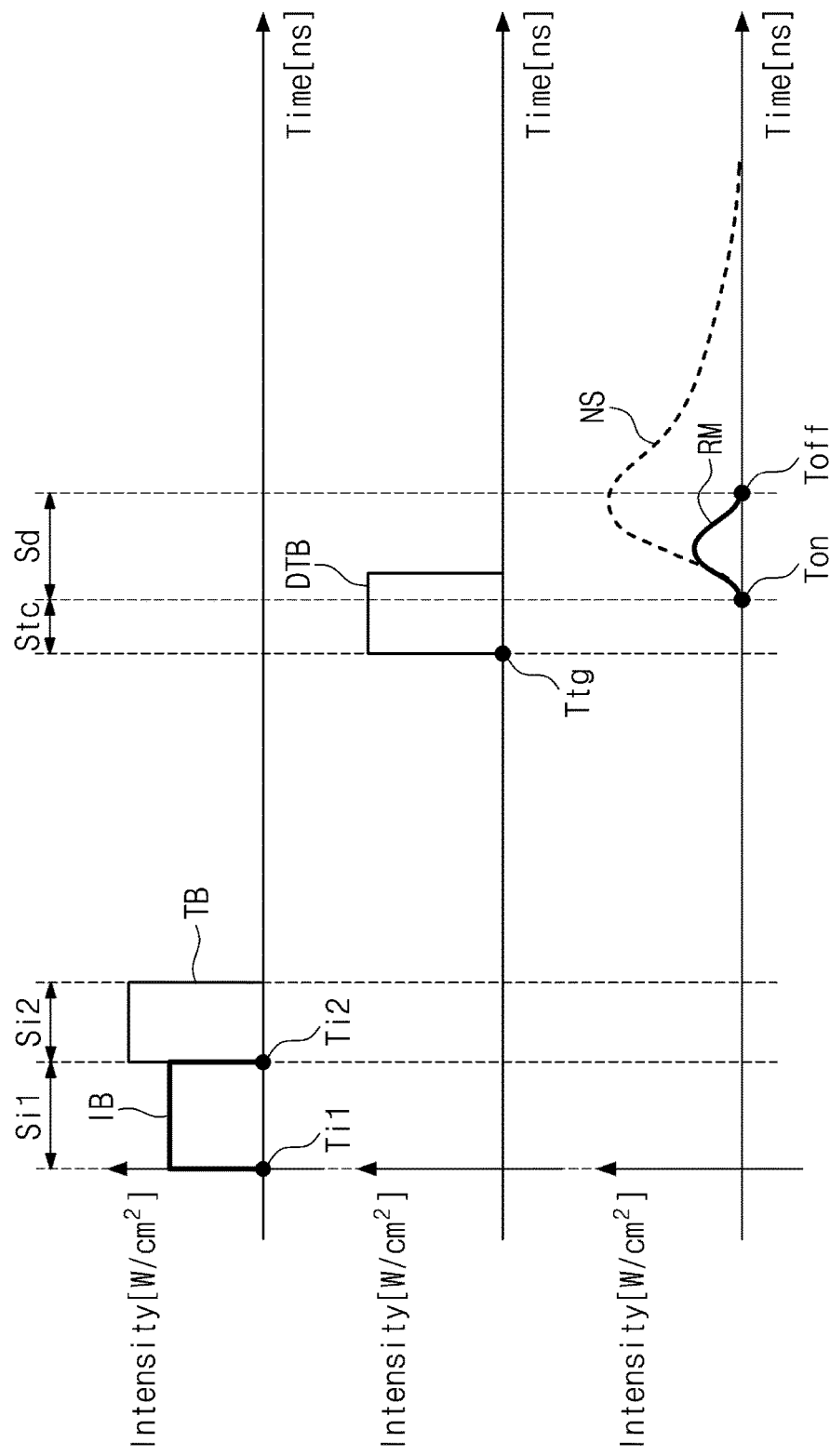
FIG. 13 is a graph illustrating signal dynamics processed by a spectroscopic apparatus of FIG. 12.

That is, the spectroscopic apparatus 2000 according to an embodiment of the inventive concept may be an asynchronous spectroscopic apparatus that determines the timing of processing the second detected signal DS2, based on the delayed trigger beam DTB without a separate module that synchronizes the multi-channel laser irradiation device 2100 with the detector 2200, FIG. 13 is a graph illustrating signals processed by a spectroscopic apparatus of FIG. 12. For convenience of description, a graph of signals in FIG. 13 will be described with reference to the spectroscopic apparatus 2000 of FIG. 12. Referring to FIGS. 12 and 13, the incident beam IB and the trigger beam TB that are irradiated by the multi-channel laser irradiation device 2100 are illustrated. In addition, the delayed trigger beam DTB received to the signal processor 2220, and the Raman signal RM and the noise signal NS included in the second detected signal DS2 are illustrated.

The multi-channel laser irradiation device 2100 may include information of a first irradiation section Si1 and information of a first irradiation time Ti1. The first irradiation section Si1 may be a section corresponding to a time for irradiating the incident beam IB. The first irradiation time Ti1 may be a time for starting irradiation of the incident beam IB. The multi-channel laser irradiation device 2100 may irradiate the incident beam IB to the sample SP for a time corresponding to the first irradiation section Si1 from the first irradiation time Ti1.

The multi-channel laser irradiation device 2100 may include information on the second irradiation section Si2 and information on the second irradiation time Ti2. The second irradiation section Si2 may be a section corresponding to a time for irradiating the trigger beam TB. The second irradiation time Ti2 may be a time for starting irradiation of the trigger beam TB. The multi-channel laser irradiation device 2100 may output the trigger beam TB to the delay element 2500 for a time corresponding to the second irradiation section Si2 from the second irradiation time Ti2. The first irradiation section may be the same as the second irradiation section. The first irradiation time may be the same as the second irradiation time.

In an exemplary embodiment, the multi-channel laser irradiation device 2100 may simultaneously output the incident beam IB and the trigger beam TB. In this case, since the characteristics of the incident beam IB are different from the characteristics of the trigger beam TB, the incident beam IB and the trigger beam TB may be distinguished to each other. For example, the multi-channel laser irradiation device 2100 may simultaneously output the incident beam IB having a first wavelength and the trigger beam TB having a second wavelength different from the first wavelength.

The signal processor 2220 may receive the delayed trigger beam DTB from the delay element 2500. The signal processor 2220 may determine a time at which the delayed trigger beam DTB is received as the trigger time Ttg. The signal processor 2220 may include information on the timing control section Stc corresponding to a difference in reception time between the delayed trigger beam DTB and the Raman signal RM.

Separately from the delay time, which is the time that the delay element 2500 delays the trigger beam TB, the timing control section Stc may be a section corresponding to a time it takes for the signal processor 2220 to start measuring the Raman signal RM in response to the delayed trigger beam DTB. The signal processor 2220 may determine a time after the timing control section Stc from the trigger time Ttg as the measurement start time Ton.

The signal processor 2220 may receive the second detected signal DS2. The signal processor 2220 may include information of the detection section Sd measuring the second detected signal DS2. The detection section Sd may be a section corresponding to the lifetime of the Raman signal RM. The signal processor 2220 may determine a time when a time corresponding to the detection section Sd elapses from the measurement start time Ton, as the measurement end time Toff. The signal processor 2220 may measure the second detected signal DS2 from the measurement start time Ton to the measurement end time Toff.

As described above, according to an embodiment of the inventive concept, the spectroscopic apparatus 2000 may be provided that determines the measurement start time Ton, based on the trigger time Ttg at which the delayed trigger beam DTB is received.

Figure 14:
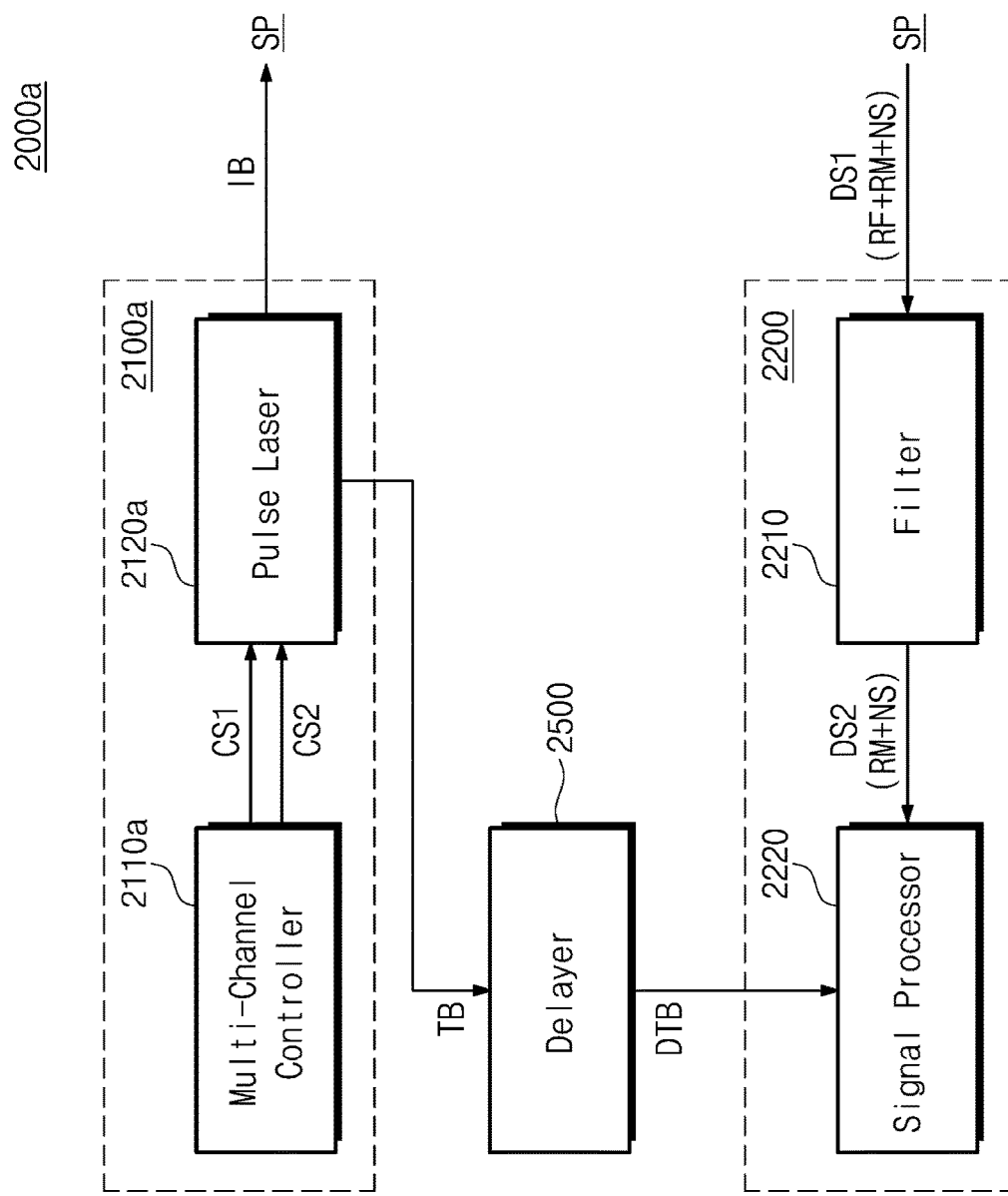
FIG. 14 is a block diagram exemplarily embodying a spectroscopic apparatus of FIG. 12.

FIG. 14 is a block diagram exemplarily embodying a spectroscopic apparatus of FIG. 12. Referring to FIG. 14, a spectroscopic apparatus 2000a may include a multi-channel laser irradiation apparatus 2100a, the detector 2200, and the delay element 2500. Since the characteristics of the detector 2200 and the delay element 2500 are similar to those of the detector 2200 and the delay element 2500 of FIG. 12, additional descriptions thereof will be omitted to avoid redundancy.

The multi-channel laser irradiation apparatus 2100a may include a multi-channel controller 2110a and a pulse laser 2120a. The multi-channel controller 2110a may output a first control signal CS1 including the first wavelength and the first frequency information and a second control signal CS2 including the second wavelength and the second frequency information. In an exemplary embodiment, the second wavelength may be different from the first wavelength.

The pulse laser 2120a may receive the control signals CS1 and CS2 from the multi-channel controller 2110a. The pulse laser 2120a may irradiate the sample SP with the incident beam IB having a first wavelength and a first frequency, based on the first control signal CS1. The pulse laser 2120a may output the trigger beam TB having a second wavelength and a second frequency to the delay element 2500, based on the second control signal CS2.

That is, the spectroscopic apparatus 2000a according to an embodiment of the inventive concept may be an asynchronous spectroscopic apparatus that outputs the incident beam IB having the first wavelength and the first frequency and the trigger beam TB having the second wavelength and the second frequency through the multi-channel laser irradiation apparatus 2100a, and controls the timing of extracting the Raman signal RM by using the trigger beam DTB delayed through the delay element 2500 as the trigger.

Figure 15:
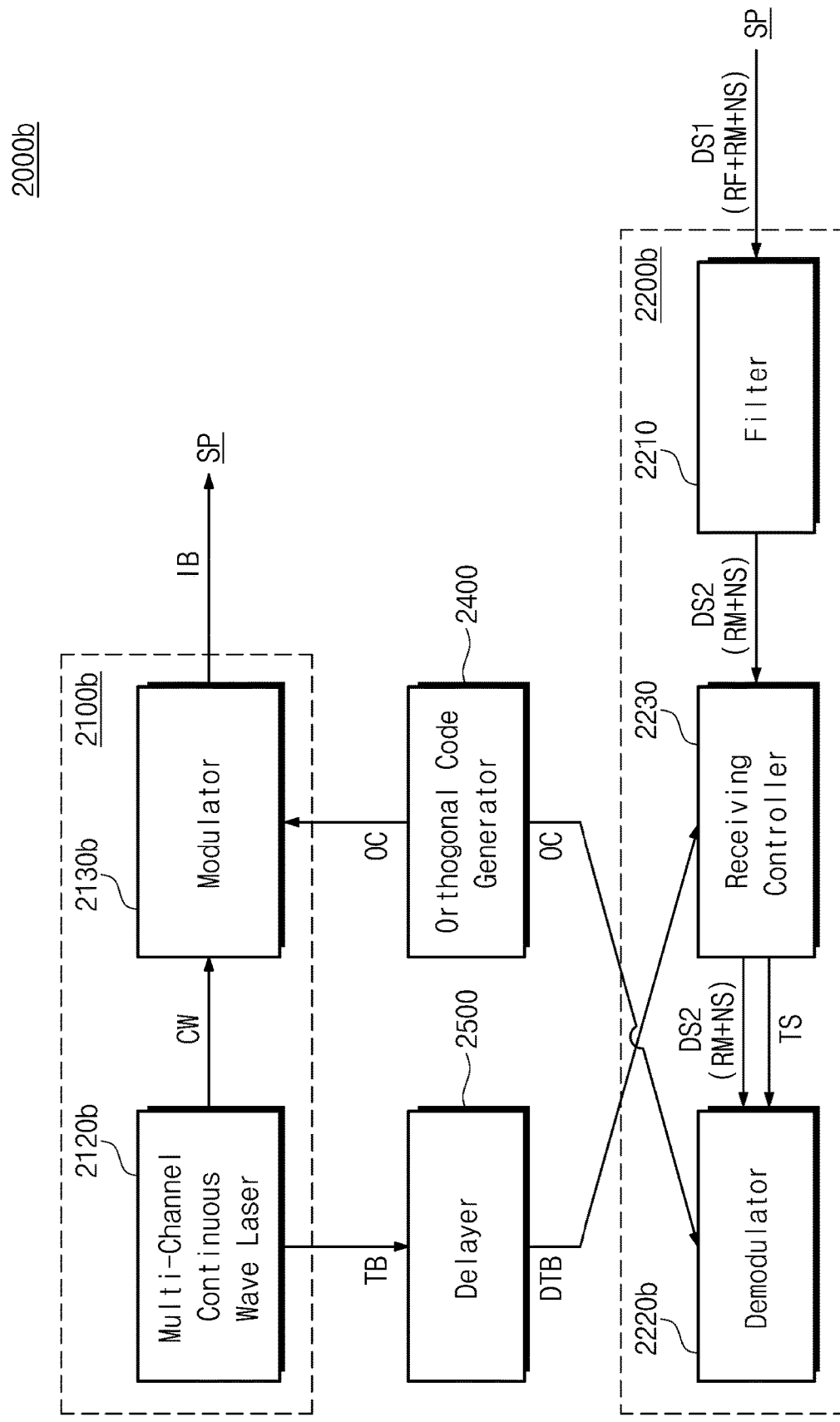
FIG. 15 is a block diagram exemplarily embodying a spectroscopic apparatus of FIG. 12.

FIG. 15 is a block diagram exemplarily embodying a spectroscopic apparatus of FIG. 12. Referring to FIG. 15, a spectroscopic apparatus 2000b may include a multi-channel laser irradiation device 2100b, a detector 2200b, an orthogonal code generator 2400, and the delay element 2500. Since the characteristics of the orthogonal code generator 2400 is similar to that of the orthogonal code generator 140 of FIG. 5, additional descriptions thereof will be omitted to avoid redundancy.

The multi-channel laser irradiation device 2100b may include a multi-channel continuous wave laser 2120b and a modulator 2130b. The multi-channel laser irradiation device 2100b may output the continuous wave laser beam CW having a first frequency and the trigger beam TB having a second frequency. In an exemplary embodiment, the second frequency may be different from the first frequency.

The modulator 2130b may receive the continuous wave laser beam CW from the multi-channel continuous wave laser 2120b. The modulator 2130b may receive the orthogonal code OC from the orthogonal code generator 2400. The modulator 2130b may irradiate the sample SP with the incident beam IB obtained by modulating the continuous wave laser beam CW based on the orthogonal code OC.

The detector 2200b may include the filter 2210, a receiving controller 2230, and a demodulator 2220b. The filter 2210 may cut off the reflected signal RF of the first detected signal DS1 to output the second detected signal DS2.

The receiving controller 2230 may receive the second detected signal DS2 from the filter 2210. The receiving controller 2230 may convert the second detected signal DS2, which is the laser beam, into the second detected signal DS2, which is the electrical signal that can be demodulated by the demodulator 2220b and may output the converted second detected signal DS2. The receiving controller 2230 may receive the delayed trigger beam DTB from the delay element 2500. The receiving controller 2230 may output the trigger signal TS that controls the timing at which the demodulator 2220b demodulates the second detected signal DS2 based on the delayed trigger beam DTB.

The demodulator 2220b may receive the second detected signal DS2 and the trigger signal TS from the receiving controller 2230. The demodulator 2220b may receive the orthogonal code OC from the orthogonal code generator 2400. The demodulator 2220b may demodulate the second detected signal DS2 based on the orthogonal code OC to extract the Raman signal RM. The timing at which the demodulator 2220b demodulates the second detected signal DS2 may be determined based on the trigger signal TS.

As described above, the spectroscopic apparatus 2000b according to an embodiment of the inventive concept may be an asynchronous spectroscopic apparatus that irradiates the incident beam IB obtained by modulating the continuous wave laser beam CW having the first frequency through the laser irradiation device 2100b, and outputs the trigger beam TB having the second frequency to the delay element 2500, and controls the timing of demodulating the second detected signal DS2 based on the trigger beam DTB delayed through the delay element 2500.

Figure 16:
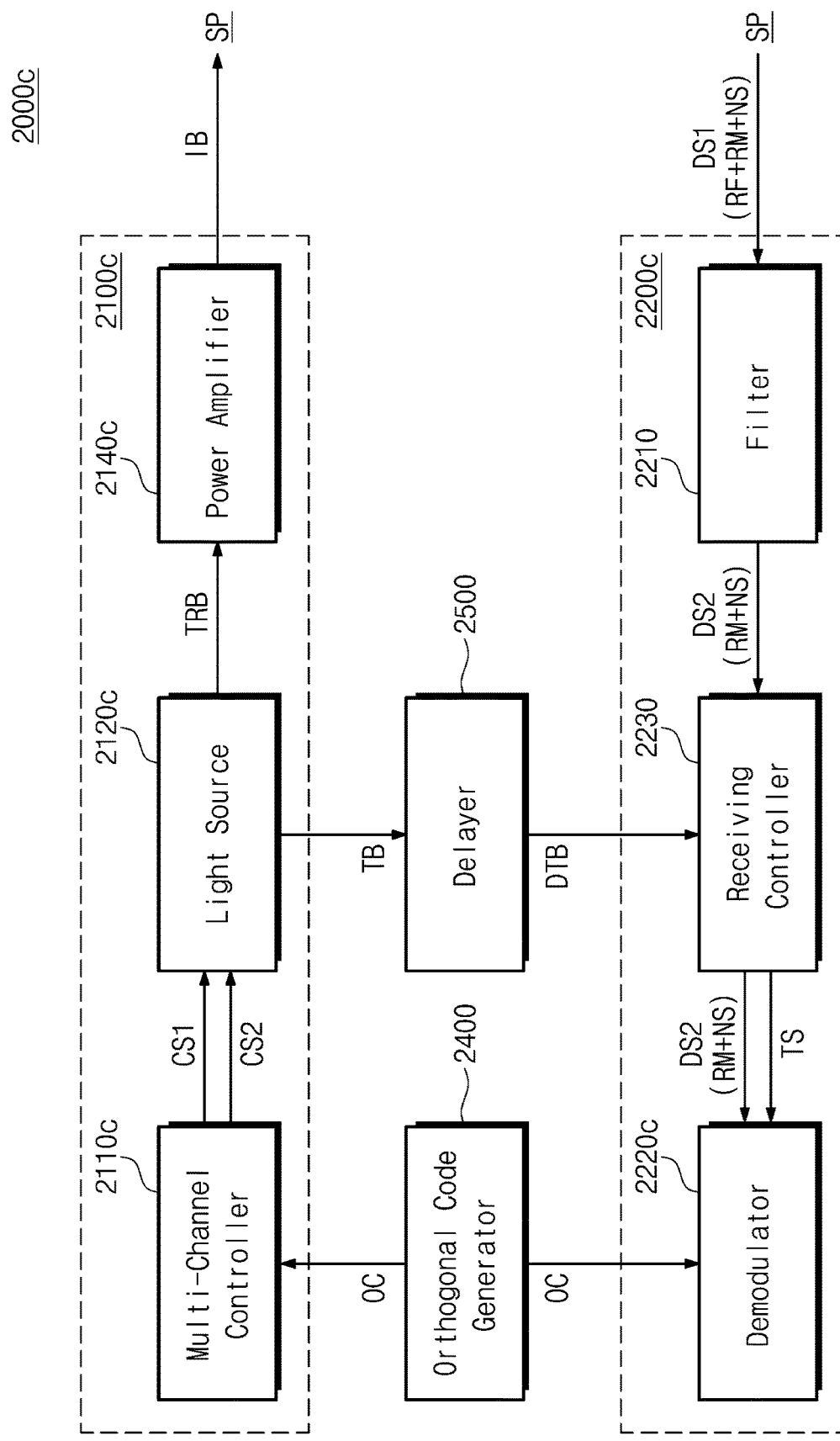
FIG. 16 is a block diagram exemplarily embodying a spectroscopic apparatus of FIG. 12.

FIG. 16 is a block diagram exemplarily embodying a spectroscopic apparatus of FIG. 12. Referring to FIG. 16, a spectroscopic apparatus 2000c may include a multi-channel laser irradiation device 2100c, a detector 2200c, the orthogonal code generator 2400, and the delay element 2500. Since the characteristics of the detector 2200c, the orthogonal code generator 2400, and the delay element 2500 are similar to those of the detector 2200b, the orthogonal code generator 2400, and the delay element 2500 of FIG. 15, respectively, additional descriptions thereto will be omitted to avoid redundancy.

The multi-channel laser irradiation device 2100c may include a multi-channel controller 2110c, a light source 2120c, and a power amplifier 2140c. The multi-channel controller 2110c may receive the orthogonal code OC from the orthogonal code generator 2400. The multi-channel controller 2110c may output a first control signal CS1 including information of the orthogonal code OC and a first wavelength and a first frequency information. The multi-channel controller 2110c may output the second control signal CS2 including a second wavelength and a second frequency information. In an exemplary embodiment, the second wavelength and the second frequency may be different from the first wavelength and the first frequency, respectively.

The light source 2120c may receive the control signals CS1 and CS2 from the multi-channel controller 2110c. The light source 2120c may output the time-resolved beam TRB that includes orthogonal code OC information based on the first control signal CS1 and has the first wavelength and the first frequency. The light source 2120c may output the trigger beam TB having the second wavelength and the second frequency. That is, the light source 2120c may be a device that outputs the pulse laser beam having the first wavelength and the first frequency and the pulse laser beam having the second wavelength and the second frequency.

The power amplifier 2140c may receive the time-resolved beam TRB from the light source 2120c. The power amplifier 2140c may irradiate the sample SP with the incident beam IB obtained by amplifying the time-resolved beam TRB.

As described above, the spectroscopic apparatus 2000c according to an embodiment of the inventive concept may be an asynchronous spectroscopic apparatus that allows the light source 2120c to output the time-resolved beam TRB including the information of the orthogonal code OC and having the first wavelength and the first frequency, and allows the light source 2120c to output the trigger beam TB having the second wavelength and the second frequency, and controls the timing of demodulating the second detected signal DS2, based on the delayed trigger beam DTB through the delay element 2500.

In addition, according to an embodiment of the inventive concept, by directly controlling the light source 2120c that generates the time-resolved beam TRB, a synchronous spectroscopic apparatus may be provided that irradiates the incident beam IB having a waveform similar to a laser beam modulated at the high frequency without a separate modulation module.

Figure 17:
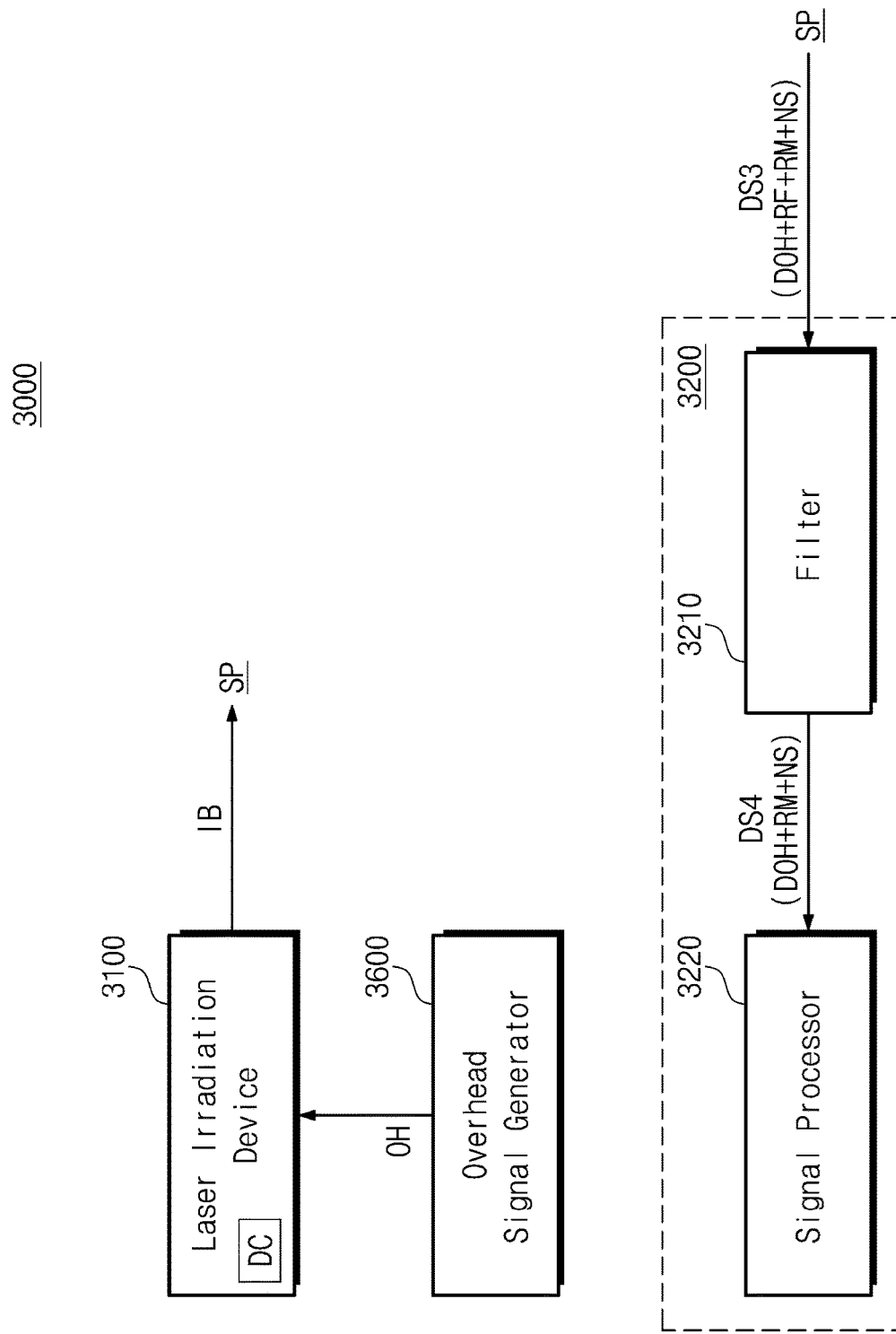
FIG. 17 is a block diagram illustrating a spectroscopic apparatus according to an embodiment of the inventive concept.

FIG. 17 is a block diagram illustrating a spectroscopic apparatus according to an embodiment of the inventive concept. Referring to FIG. 17, a spectroscopic apparatus 3000 may include a laser irradiation device 3100, a detector 3200, and an overhead signal generator 3600.

The overhead signal generator 3600 may generate and output an overhead signal OH. The overhead signal OH may be a signal that allows the incident beam IB to include a laser beam in an overhead section. The overhead section may include an overhead start section and an overhead end section. The overhead start section may be a section indicating a time when the overhead section starts. The overhead end section may be a section indicating a time to start measurement of the Raman signal RM.

The laser irradiation device 3100 may receive the overhead signal OH from the overhead signal generator 3600. The laser irradiation device 3100 may include a detection code DC. The detection code DC may be a code that controls the output of the incident beam IB in the irradiation section.

In an exemplary embodiment, a signal processor 3220 may receive a fourth detection signal DS4 of the detection section, based on the incident beam IB of the irradiation section. The irradiation section may be a section different from the overhead start section and the overhead end section.

The laser irradiation device 3100 may irradiate the incident beam IB to the sample SP, based on the detection code DC and the received overhead signal OH. In this case, the incident beam IB may include the overhead start section and the overhead end section before the irradiation section. That is, the incident beam IB may be a laser beam sequentially including the overhead start section, the overhead end section, and the irradiation section.

The detector 3200 may include a filter 3210 and the signal processor 3220. The filter 3210 may receive a third detected signal DS3 output from the sample SP. The third detected signal DS3 may include a detected overhead signal DOH, the reflected signal RF, the Raman signal RM, and the noise signal NS. The detected overhead signal DOH may be a signal output from the sample SP, based on the incident beam IB corresponding to the overhead section. The filter 3210 may output the fourth detection signal DS4 in which the reflected signal RF is cut off from the third detected signal DS3.

The signal processor 3220 may receive the fourth detection signal DS4 from the filter 3210. The signal processor 3220 may extract the Raman signal RM included in the fourth detection signal DS4. Unlike a signal processor (e.g., the signal processor 122 of FIG. 2) of the synchronous spectroscopic apparatus, in which the precise control in units of the nanosecond is required for synchronization with a laser irradiation device, the signal processor 3220 may determine the timing of processing the fourth detection signal DS4, based on the detected overhead signal DOH.

That is, the spectroscopic apparatus 3000 according to an embodiment of the inventive concept may be an asynchronous spectroscopic apparatus that irradiates the incident beam IB based on the overhead signal OH and the detection code DC, and determines the timing of processing the fourth detection signal DS4 based on the detected overhead signal DOH.

Figure 18:
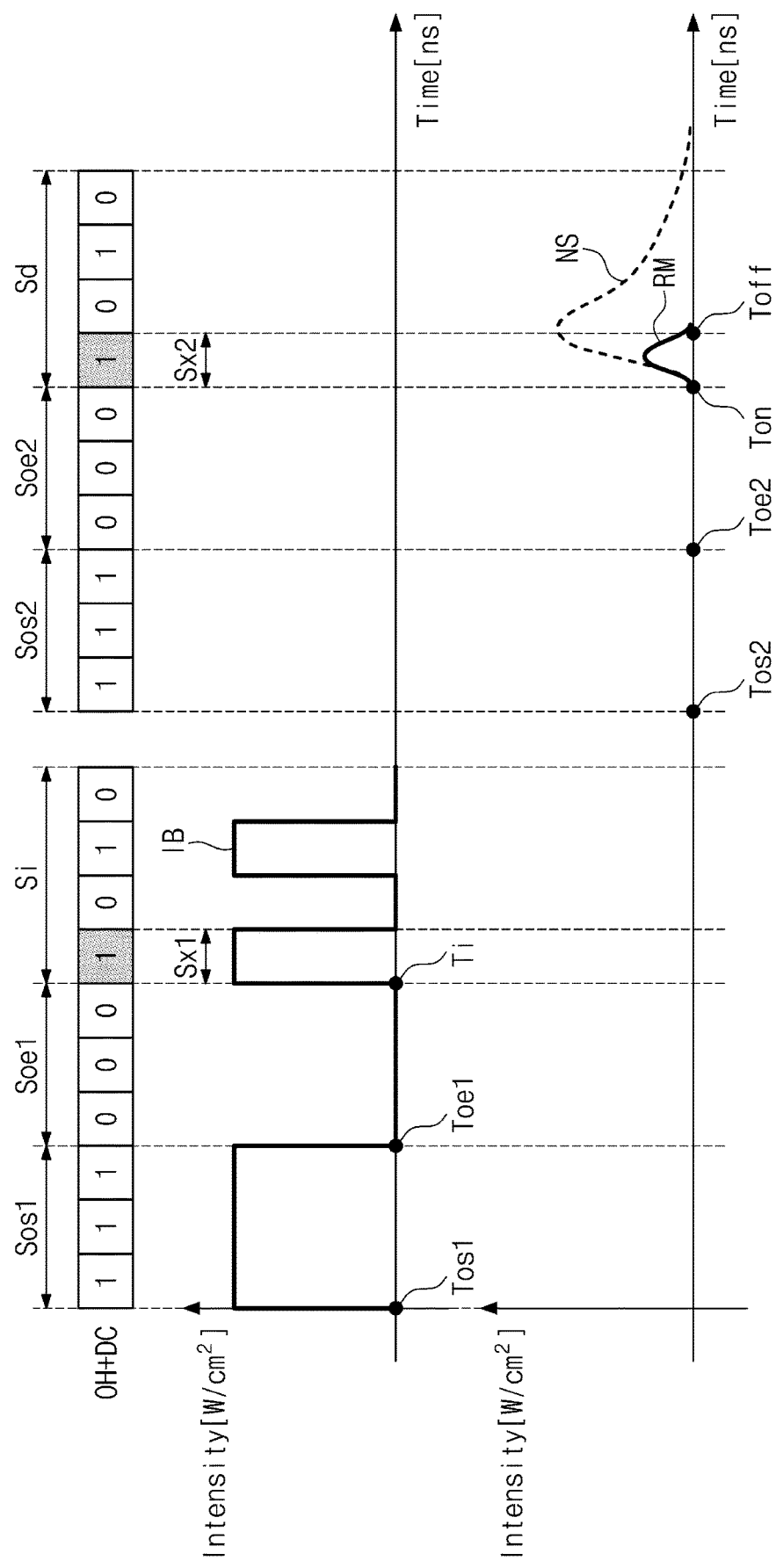
FIG. 18 is a graph illustrating signal dynamics processed by spectroscopic apparatus of FIG. 17.

FIG. 18 is a graph illustrating signals processed by spectroscopic apparatus of FIG. 17. For convenience of description, a graph of signals of FIG. 18 will be described with reference to the spectroscopic apparatus 3000 of FIG. 17. Referring to FIGS. 17 and 18, the incident beam IB irradiated by the laser irradiation device 3100 and the Raman signal RM and the noise signal NS included in the fourth detection signal DS4 received to the detector 3200 are illustrated.

The overhead signal OH output from the overhead signal generator 3600 may include a series of overhead start bits and a series of overhead end bits. For example, the overhead signal OH may be a signal including information in which overhead end bits having the value of '0' are consecutive after the overhead start bit having the value of '1' are consecutive.

The laser irradiation device 3100 may irradiate the incident beam IB, based on the detection code DC and the received overhead signal OH. The incident beam IB may include a first overhead start section Sos1, a first overhead end section Soe1, and the irradiation section Si.

The first overhead start section Sos1 may be a section corresponding to a series of overhead start bits. The first overhead end section Soe1 may be a section corresponding to a series of overhead end bits. The irradiation section Si may be a section corresponding to the detection code DC.

For example, a value of a series of bits included in the overhead signal OH may be '111000'. The detection code DC may be '1010'. The laser irradiation device 3100 may irradiate the incident beam IB corresponding to the series of bits having a value of '1110001010', based on the detection code DC and the received overhead signal OH. The incident beam IB may be a laser beam output in a section corresponding to a bit having the value of '1'. The incident beam IB may be a laser beam of which output is suppressed in a section corresponding to a bit having the value of '0'.

The signal processor 3220 may receive the fourth detection signal DS4 including the detected overhead signal DOH, the Raman signal RM, and the noise signal NS from the filter 3210. To help the understanding of the inventive concept, only the waveforms of the Raman signal RM and the noise signal NS are illustrated, but the signal processor 3220 may receive the detected overhead signal DOH in a second overhead start section Sos2 and a second overhead end section Soe2.

The fourth detection signal DS4 may include the second overhead start section Sos2, the second overhead end section Soe2, and the detection section Sd. The second overhead start section Sos2 may be a section corresponding to the fourth detection signal DS4 that is received based on the incident beam IB of the first overhead start section Sos1. The second overhead end section Soe2 may be a section corresponding to the fourth detection signal DS4 that is received based on the incident beam IB of the second overhead end section Soe2. The detection section Sd may be a section corresponding to the fourth detection signal DS4 that is received based on the incident beam IB of the irradiation section Si. The detection section Sd may be a section measuring the characteristics of the sample SP.

For example, the signal processor 3220 may receive the detected overhead signal DOH corresponding to a bit having the value of '1' in the second overhead start section Sos2. An intensity of the detected overhead signal DOH may decrease in the second overhead end section Soe2. The signal processor 3220 may receive the Raman signal RM and the noise signal NS in the detection section Sd.

According to an embodiment of the inventive concept, the signal processor 3220 may determine the second overhead start time Tos2, based on the fourth detection signal DS4 that is received in the second overhead start section Sos2. The second overhead start time Tos2 may be a time when the signal processor 3220 receives the fourth detection signal DS4 corresponding to the overhead start bits.

The signal processor 3220 may determine the second overhead end time Toe2 based on the fourth detection signal DS4 received in the second overhead end section Soe2. The second overhead end time Toe2 may be a time when the signal processor 3220 receives the fourth detection signal DS4 corresponding to the overhead end bit.

The signal processor 3220 may determine the measurement start time Ton, based on the second overhead start time Tos2 and the second overhead end time Toe2. For example, the number of overhead start bits and the number of overhead end bits included in the overhead signal OH may be the same to each other. A length of the second overhead start section Sos2 and a length of the second overhead end section Soe2 may be the same to each other. The signal processor 3220 may determine a time elapsed by a difference between the second overhead start time Tos2 and the second overhead end time Toe2 from the second overhead end time Toe2 as the measurement start time Ton.

According to an embodiment of the inventive concept, the signal processor 3220 may include information of time corresponding to one bit. The signal processor 3220 may determine a time when a time corresponding to one bit elapses from the measurement start time Ton as the measurement end time Toff. The signal processor 3220 may measure the fourth detection signal DS4 from the measurement start time Ton to the measurement end time Toff. The measured fourth detection signal DS4 may include the Raman signal RM.

According to an embodiment of the inventive concept, the signal processor 3220 may measure the Raman signal RM in the fourth detection signal DS4 of the detection section Sd. For example, the laser irradiation device 3100 may irradiate the incident beam IB in a first specific section Sx1 corresponding to a specific bit. The signal processor 3220 may receive the Raman signal RM and the noise signal NS in a second specific section Sx2 corresponding to a specific bit. In this case, the Raman signal RM and the noise signal NS may be signals generated based on the incident beam IB corresponding to the first specific section Sx1.

As described above, according to an embodiment of the inventive concept, the spectroscopic apparatus 3000 may be provided that irradiates the incident beam IB including the overhead start section and the overhead end section, and determines the measurement start time Ton, based on the overhead start section and the overhead end section of the fourth detection signal DS4.

Figure 19:
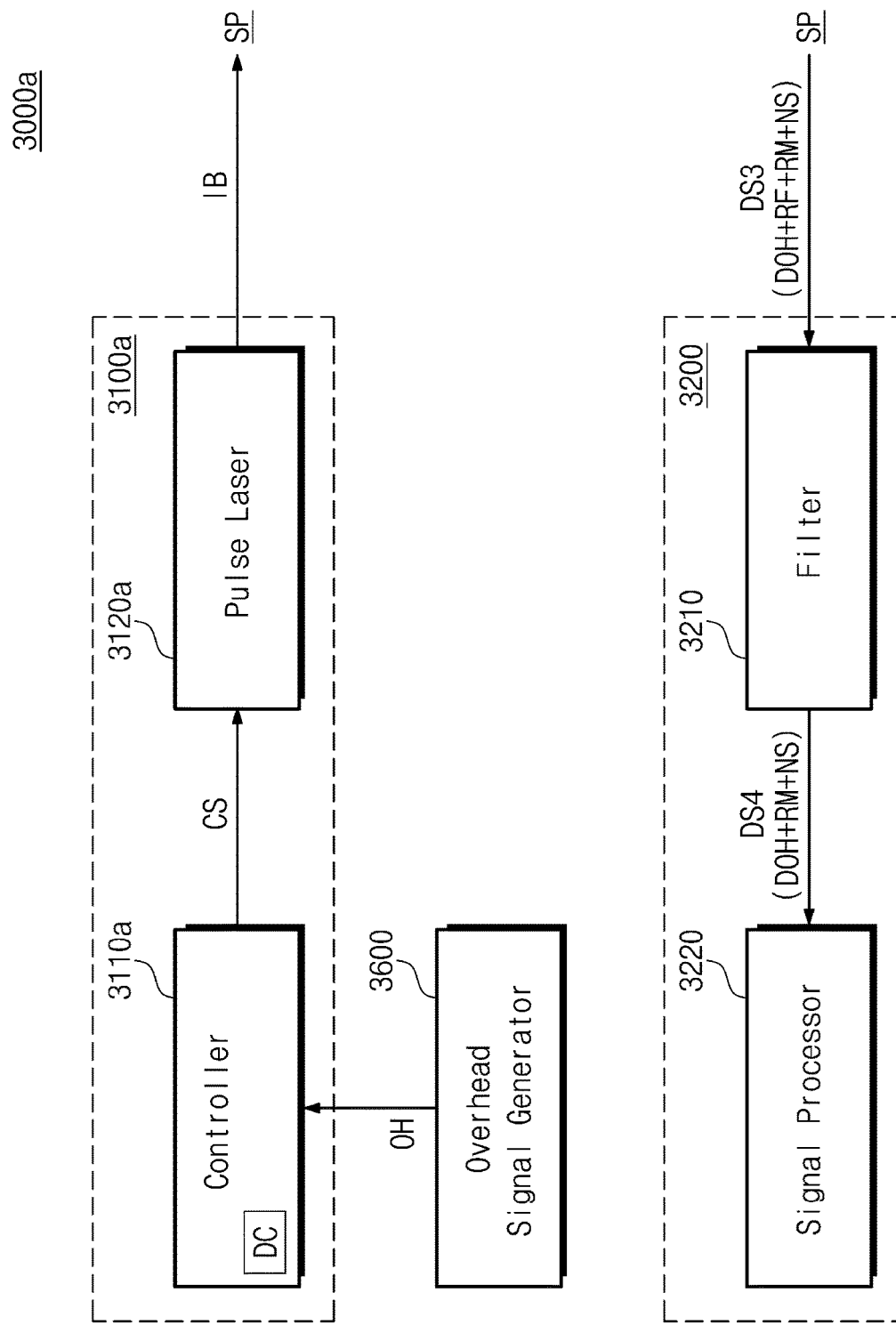
FIG. 19 is a block diagram exemplarily embodying a spectroscopic apparatus of FIG. 17.

FIG. 19 is a block diagram exemplarily embodying a spectroscopic apparatus of FIG. 17. Referring to FIG. 19, a spectroscopic apparatus 3000a may include a laser irradiation device 3100a, the detector 3200, and the overhead signal generator 3600. Since the characteristics of the detector 3200 and the overhead signal generator 3600 are similar to those of the detector 3200 and the overhead signal generator 3600 of FIG. 17, additional descriptions thereof will be omitted to avoid redundancy.

The laser irradiation device 3100a may include a controller 3110a and a pulse laser 3120a. The controller 3110a may receive the overhead signal OH from the overhead signal generator 3600. The controller 3110a may include the detection code DC. The controller 3110a may output the control signal CS that controls irradiation of the incident beam IB, based on the overhead signal OH and the detection code DC.

The pulse laser 3120a may receive the control signal CS from the controller 3110a. The pulse laser 3120a may irradiate the sample with the incident beam IB, based on the received control signal CS. In this case, the incident beam IB may sequentially include the overhead start section, the overhead end section, and the irradiation section.

In an exemplary embodiment, the control signal CS may include bits corresponding to each of the overhead start section, the overhead end section, and the irradiation section. In a section corresponding to a bit having the value of '1' among the bits, the incident beam IB may include the pulse laser beam. In a section corresponding to a bit having the value of '0' among the bits, the incident beam IB may not include the pulse laser beam. In this case, a wavelength of the pulse laser beam may be less than a section corresponding to one bit.

That is, the spectroscopic apparatus 3000a according to an embodiment of the inventive concept may be an asynchronous spectroscopic apparatus that irradiates the sample SP with the incident beam IB sequentially including the overhead start section, the overhead end section, and the irradiation section through the laser irradiation device 3100a, and controls the timing of extracting the Raman signal RM, based on the overhead start section and the overhead end section of the fourth detection signal DS4.

Figure 20:
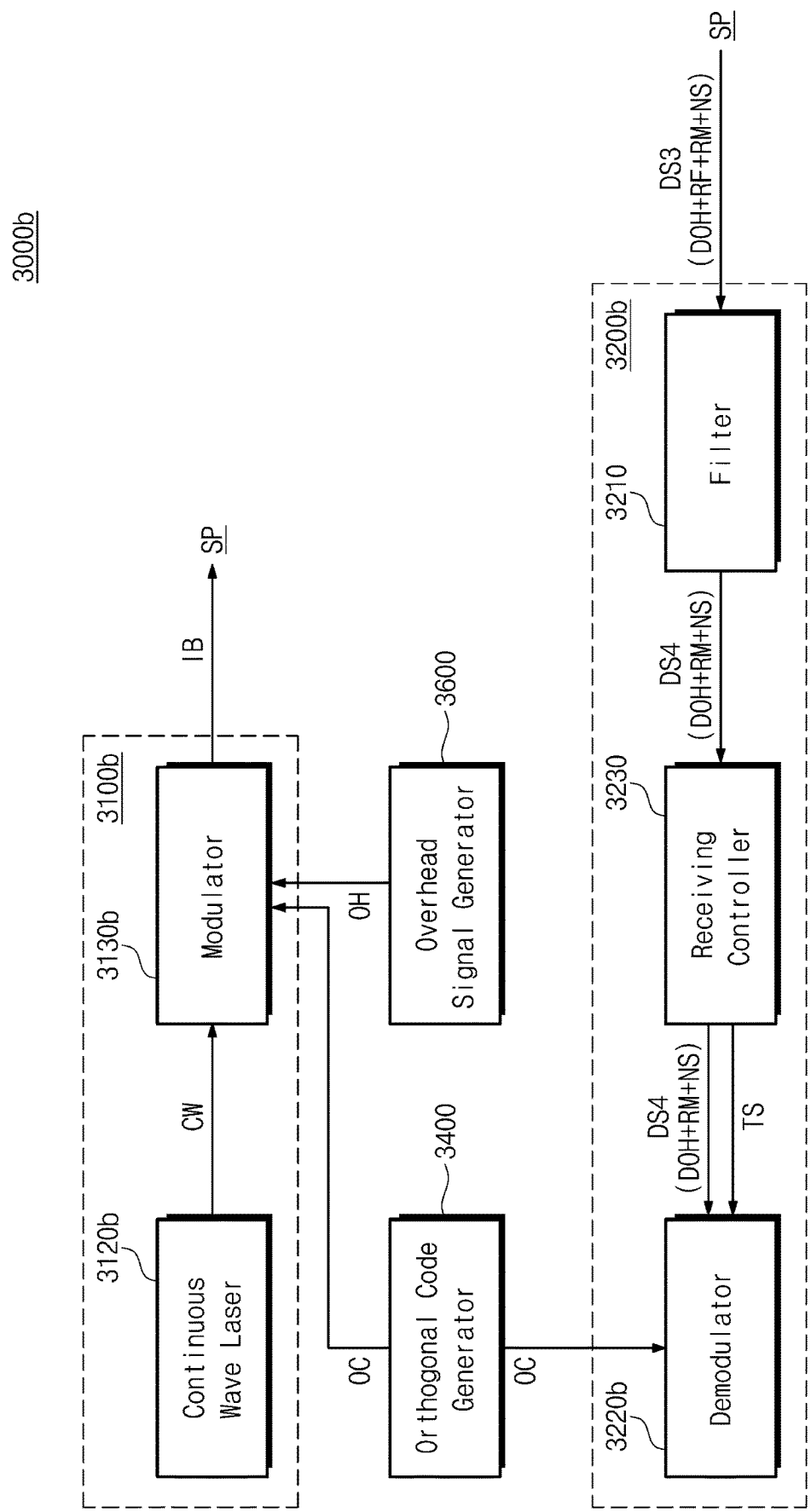
FIG. 20 is a block diagram exemplarily embodying a spectroscopic apparatus of FIG. 17.

FIG. 20 is a block diagram exemplarily embodying a spectroscopic apparatus of FIG. 17. Referring to FIG. 20, a spectroscopic apparatus 3000b may include a laser irradiation device 3100b, a detector 3200b, an orthogonal code generator 3400, and the overhead signal generator 3600. Since the characteristics of a continuous wave laser 3120b and the orthogonal code generator 3400 are similar to those of the continuous wave laser 112b and the orthogonal code generator 140 of FIG. 5, additional descriptions thereof will be omitted to avoid redundancy.

A modulator 3130b may receive the continuous wave laser beam CW from the continuous wave laser 3120b. The modulator 3130b may receive the orthogonal code OC from the orthogonal code generator 3400. The modulator 3130b may receive the overhead signal OH from the overhead signal generator 3600. The modulator 3130b may modulate the continuous wave laser beam CW, based on the orthogonal code OC and the overhead signal OH to output the incident beam IB. The incident beam IB may sequentially include the overhead start section, the overhead end section, and the irradiation section.

For example, the incident beam IB may include a plurality of pulse laser beams in the overhead start section. An output of the incident beam IB may be suppressed in the overhead end section. The incident beam IB may include the pulse laser beam in a section corresponding to a bit having the value of '1' among bits included in the orthogonal code OC in the irradiation section.

The detector 3200b may include the filter 3210, a receiving controller 3230, and a demodulator 3220b. The filter 3210 may cut off the reflected signal RF of the third detected signal DS3 to output the fourth detection signal DS4.

The receiving controller 3230 may receive the fourth detection signal DS4 from the filter 3210. The receiving controller 3230 may output the trigger signal TS that controls timing to demodulate the Raman signal RM, based on the detected overhead signal DOH included in the fourth detection signal DS4. The receiving controller 3230 may convert the fourth detection signal DS4, which is the laser beam, into the fourth detection signal DS4, which is the electrical signal that can be demodulated by the demodulator 3220b and may output the converted fourth detection signal DS4.

The demodulator 3220b may receive the fourth detection signal DS4 and the trigger signal TS from the receiving controller 3230. The demodulator 3220b may receive the orthogonal code OC from the orthogonal code generator 3400. The demodulator 3220b may demodulate the fourth detection signal DS4, based on the orthogonal code OC to extract the Raman signal RM. The timing at which the demodulator 3220b demodulates the fourth detection signal DS4 may be determined based on the trigger signal TS.

As described above, the spectroscopic apparatus 3000b according to an embodiment of the inventive concept may be an asynchronous spectroscopic apparatus that irradiates the sample SP with the incident beam IB sequentially including the overhead start section, the overhead end section, and the irradiation section through the laser irradiation device 3100b, and controls the timing of demodulating the Raman signal RM, based on the overhead start section and the overhead end section of the fourth detection signal DS4.

Figure 21:
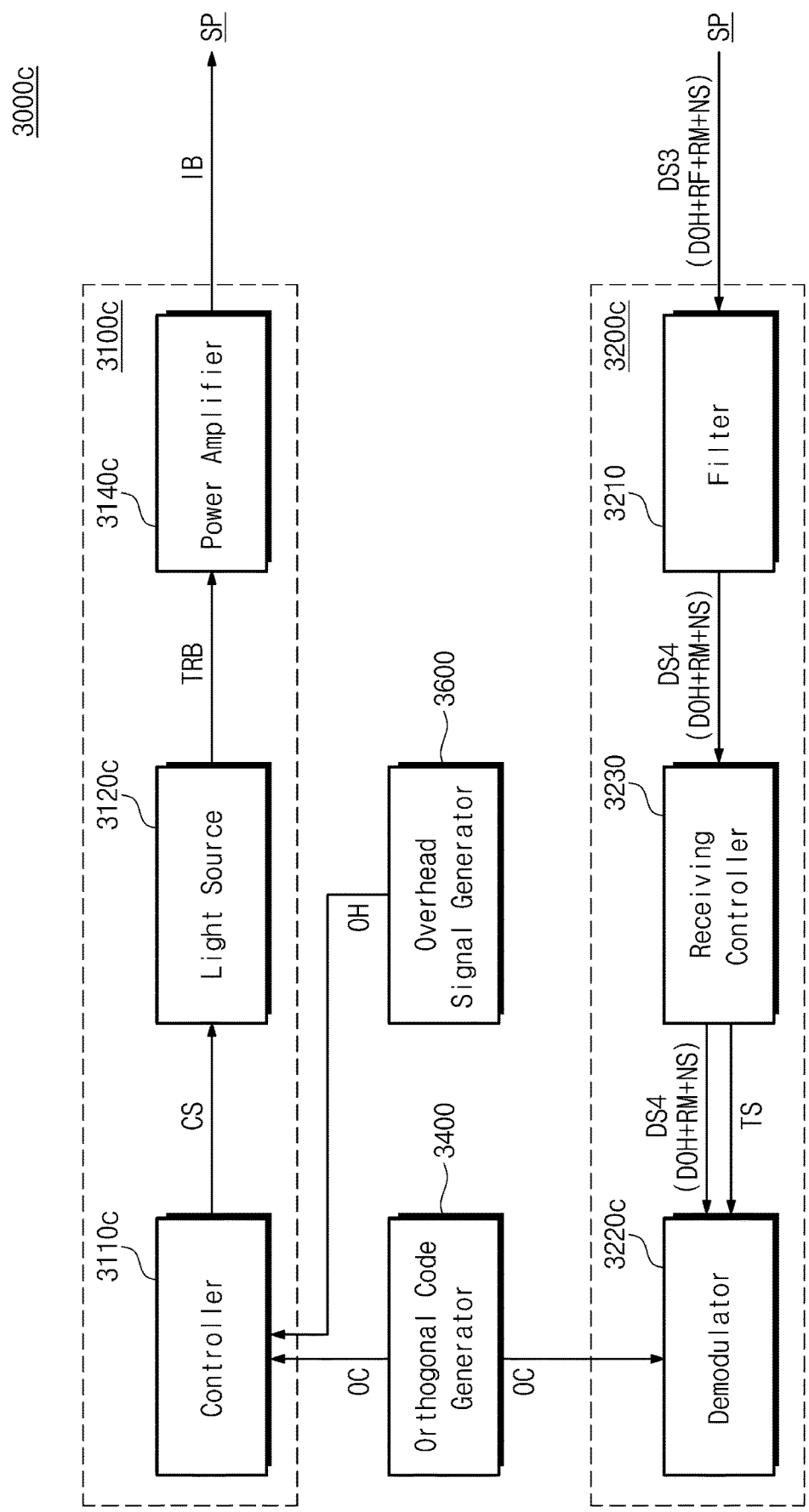
FIG. 21 is a block diagram exemplarily embodying a spectroscopic apparatus of FIG. 17.

FIG. 21 is a block diagram exemplarily embodying a spectroscopic apparatus of FIG. 17. Referring to FIG. 21, a spectroscopic apparatus 3000c may include a laser irradiation device 3100c, a detector 3200c, the orthogonal code generator 3400, and the overhead signal generator 3600. Since the characteristics of the detector 3200c, the orthogonal code generator 3400, and the overhead signal generator 3600 are similar to those of the detector 3200b, the orthogonal code generator 3400, and the overhead signal generator 3600 in FIG. 20, additional descriptions thereof will be omitted to avoid redundancy.

The laser irradiation device 3100c may include a controller 3110c, a light source 3120c, and a power amplifier 3140c. The controller 3110c may receive the orthogonal code OC from the orthogonal code generator 3400. The controller 3110c may receive the overhead signal OH from the overhead signal generator 3600. The controller 3110c may output the control signal CS including information on the overhead start section, the overhead end section, and the irradiation section.

The light source 3120c may receive the control signal CS from the controller 3110c. The light source 3120c may output the time-resolved beam TRB sequentially including the overhead start section, the overhead end section, and the irradiation section, based on the control signal CS.

For example, the time-resolved beam TRB may include a plurality of high frequency pulse laser beams in the overhead start section. An output of the time-resolved beam TRB may be suppressed in the overhead end section. The time-resolved beam TRB may include the pulse laser beam having the high frequency in a section corresponding to a bit having the value of '1' among bits included in the orthogonal code OC in the irradiation section.

The power amplifier 3140c may receive the time-resolved beam TRB from the light source 3120c. The power amplifier 3140c may irradiate the sample SP with the incident beam IB obtained by amplifying the time-resolved beam TRB.

As described above, the spectroscopic apparatus 3000c according to an embodiment of the inventive concept may be an asynchronous spectroscopic apparatus that allows the light source 3120c to output the time-resolved beam TRB that includes the high frequency pulse laser beam and sequentially includes the overhead start section, the overhead end section, and the irradiation section, and controls the timing of demodulating the Raman signal RM, based on the overhead start section and the overhead end section of the fourth detection signal DS4.

According to an embodiment of the inventive concept, a spectroscopic apparatus based on an asynchronous modulation is provided that controls a timing at which a detector processes a detection signal.

In addition, a spectroscopic apparatus based on an asynchronous modulation is provided that improves an accuracy and resolution of sample analysis and is implemented with a simple algorithm.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. A spectroscopic apparatus comprising:
a splitter configured to receive a first detected signal output from a sample to which an incident beam is irradiated, and to split the first detection signal into a reflected signal and a second detected signal and output the reflected signal and the second detected signal; and
a signal processor configured to receive the reflected signal and the second detected signal, and to extract a Raman signal from the second detected signal in response to the received reflected signal which is used as a trigger signal to process the second detected signal.

2. The spectroscopic apparatus of claim 1, wherein:
the first detected signal includes the reflected signal, the Raman signal, and a noise signal, and
the reflected signal reaches the splitter before the Raman signal and the noise signal.

3. The spectroscopic apparatus of claim 1, wherein the signal processor is further configured to include lifetime information of the Raman signal, and to extract the Raman signal from the second detected signal during a lifetime corresponding to the lifetime information from a timing determined based on the received reflected signal.

4. The spectroscopic apparatus of claim 1, further comprising:
a controller configured to output a control signal that controls irradiation of the incident beam; and
a pulse laser configured to receive the control signal and to irradiate the sample with the incident beam including a pulse laser beam in response to the received control signal.

5. The spectroscopic apparatus of claim 1, further comprising:
an orthogonal code generator configured to generate an orthogonal code;
a continuous wave laser configured to output a continuous wave laser beam; and
a modulator configured to receive the continuous wave laser beam and the orthogonal code, and to irradiate the sample with the incident beam obtained by modulating the continuous wave laser beam with the orthogonal code,
wherein the signal processor is further configured to receive the orthogonal code and to demodulate the second detected signal with the orthogonal code in response to the received reflected signal to extract the Raman signal.

6. The spectroscopic apparatus of claim 1, further comprising:
an orthogonal code generator configured to generate an orthogonal code;
a controller configured to receive the orthogonal code and to output a control signal based on the received orthogonal code;
a light source configured to receive the control signal and to output a time-resolved beam including a high frequency pulse laser beam in response to the control signal; and
a power amplifier configured to receive the time-resolved beam and to irradiate the sample with the incident beam obtained by amplifying the time-resolved beam,
wherein the signal processor is further configured to receive the orthogonal code and to demodulate the second detected signal with the orthogonal code in response to the received reflected signal to extract the Raman signal.

7. A spectroscopic apparatus comprising:
a multi-channel laser irradiation device configured to irradiate an incident beam to a sample and to output a trigger beam;
a delay element configured to receive the trigger beam and to output a delayed trigger beam; and
a detector configured to receive the first detected signal output from the sample to which the incident beam is irradiated and the delayed trigger beam, and to extract a Raman signal from the first detected signal in response to the delayed trigger beam.

8. The spectroscopic apparatus of claim 7, wherein the delay element is further configured to output the delayed trigger beam obtained by delaying the trigger beam by a time required for the Raman signal to reach the detector.

9. The spectroscopic apparatus of claim 7, wherein the detector includes:
a filter configured to receive the first detected signal and to output a second detected signal in which a reflected signal is cut off from the first detection signal; and
a signal processor configured to receive the second detected signal and the delayed trigger beam and to extract the Raman signal from the second detected signal in response to the delayed trigger beam.

10. The spectroscopic apparatus of claim 7, further comprising:
an orthogonal code generator configured to generate an orthogonal code,
wherein the multi-channel laser irradiation device includes:
a multi-channel continuous wave laser configured to output a continuous wave laser beam having a first frequency and the trigger beam having a second frequency different from the first frequency; and
a modulator configured to receive the continuous wave laser beam and the orthogonal code, and to irradiate the sample with the incident beam obtained by modulating the continuous wave laser beam with the orthogonal code, and
wherein the detector includes:
a filter configured to receive the first detected signal and to output a second detected signal in which a reflected signal is cut off from the first detection signal;
a receiving controller configured to receive the second detected signal and the delayed trigger beam, to output a trigger signal that determines a demodulation timing, based on the delayed trigger beam, and to output the second detected signal that is converted into an electrical signal that can be demodulated, based on the second detection signal; and
a demodulator configured to receive the converted second detection signal, the trigger signal, and the orthogonal code, and to extract the Raman signal by demodulating the converted second detected signal with the orthogonal code in response to the trigger signal.

11. The spectroscopic apparatus of claim 7, further comprising:
an orthogonal code generator configured to generate an orthogonal code,
wherein the multi-channel laser irradiation device includes:
a multi-channel controller configured to output a first control signal including a first wavelength and first frequency information, and to output a second control signal including a second wavelength and second frequency information respectively different from the first wavelength and the first frequency information;

a light source configured to receive the first and second control signals, to output a time-resolved beam including a pulse laser beam having the first wavelength and the first frequency information, based on the first control signal, and to output the trigger beam including a pulse laser beam having the second wavelength and the second frequency information, based on the second control signal; and a power amplifier configured to receive the time-resolved beam and to irradiate the sample with the incident beam obtained by amplifying the time-resolved beam, and wherein the detector includes:

a filter configured to receive the first detected signal and to output a second detected signal in which a reflected signal is cut off from the first detected signal;

a receiving controller configured to receive the second detected signal and the delayed trigger beam, to output a trigger signal that determines a demodulation timing, based on the delayed trigger beam, and to output the second detected signal that is converted into an electrical signal that can be demodulated, based on the second detected signal; and a demodulator configured to receive the converted second detected signal, the trigger signal, and the orthogonal code, and to extract the Raman signal by demodulating the converted second detected signal with the orthogonal code in response to the trigger signal.

12. A spectroscopic apparatus comprising:

an overhead signal generator configured to output an overhead signal including a series of overhead start bits and a series of overhead end bits;

a laser irradiation device configured to include a detection code, to receive the overhead signal, and to irradiate a sample with an incident beam sequentially including a first overhead start section corresponding to the overhead start bits, a first overhead end section corresponding to the overhead end bits, and an irradiation section corresponding to the detection code, which are based on the detection code and the overhead signal; and a detector configured to receive a third detected signal sequentially including a second overhead start section corresponding to the overhead start bits, a second overhead end section corresponding to the overhead end bits, and a detection section corresponding to the detection code, from the sample to which the incident beam is irradiated, to determine a timing to process the third detected signal, based on the third detected signal received in the second overhead start section and the second overhead end section, and to extract a Raman signal from the third detected signal at the determined timing.

13. The spectroscopic apparatus of claim 12, wherein the detector is further configured to determine a time at which the third detected signal of the second overhead start section is received as a second overhead start time, to determine a time at which the third detected signal of the second overhead end section is received as a second overhead end time, and to determine a time elapsed by a difference between the second overhead end time and the second overhead start time from the second overhead end time as the timing to process the third detected signal.

14. The spectroscopic apparatus of claim 12, wherein the detector includes:

a filter configured to receive the third detected signal and to output a fourth detection signal in which a reflected signal is cut off from the third detected signal; and a signal processor configured to receive the fourth detection signal and to extract the Raman signal from the fourth detection signal at the determined timing.

15. The spectroscopic apparatus of claim 14, wherein the laser irradiation device includes:

a controller configured to include the detection code, to receive the overhead signal, and to output a control signal that controls irradiation of the incident beam, based on the detection code and the overhead signal; and a pulse laser configured to receive the control signal and to irradiate the sample with the incident beam including a pulse laser beam in response to the received control signal.

16. The spectroscopic apparatus of claim 12, further comprising:

an orthogonal code generator configured to generate an orthogonal code, wherein the laser irradiation device includes:

a continuous wave laser configured to output a continuous wave laser beam; and a modulator configured to receive the continuous wave laser beam, the orthogonal code, and the overhead signal, to determine a value of the detection code, based on the orthogonal code, and to irradiate the sample with the incident beam obtained by modulating the continuous wave laser beam based on the detection code and the overhead signal, and wherein the detector includes:

a filter configured to receive the third detected signal and to output a fourth detection signal in which a reflected signal is cut off from the third detected signal;

a receiving controller configured to receive the fourth detection signal, to output a trigger signal that determines a demodulation timing, based on the fourth detection signal of the second overhead start section and the second overhead end section, and to output the fourth detection signal that is converted into an electrical signal that can be demodulated, based on the fourth detection signal; and a demodulator configured to receive the converted fourth detection signal, the trigger signal, and the orthogonal code, and to extract the Raman signal by demodulating the converted fourth detection signal with the orthogonal code in response to the trigger signal.

17. The spectroscopic apparatus of claim 12, further comprising:

an orthogonal code generator configured to generate an orthogonal code, wherein the laser irradiation device includes:

a controller configured to receive the orthogonal code and the overhead signal, to determine a value of the detection code, based on the orthogonal code, and to output a control signal, based on the detection code and the overhead signal;

a light source configured to receive the control signal, to output a time-resolved beam including a high frequency pulse laser beam in response to the control signal; and a power amplifier configured to receive the time-resolved beam and to irradiate the sample with the incident beam obtained by amplifying the time-resolved beam, and wherein the detector includes:

a filter configured to receive the third detected signal and to output a fourth detection signal in which a reflected signal is cut off from the third detected signal;

a receiving controller configured to receive the fourth detection signal, to output a trigger signal that determines a demodulation timing, based on the fourth detection signal of the second overhead start section and the second overhead end section, and to output the fourth detection signal that is converted into an electrical signal that can be demodulated, based on the fourth detection signal; and a demodulator configured to receive the converted fourth detection signal, the trigger signal, and the orthogonal code, and to extract the Raman signal by demodulating the converted fourth detection signal with the orthogonal code in response to the trigger signal.

* * * * *